(12) United States Patent
Ullah

(10) Patent No.: US 12,504,288 B1
(45) Date of Patent: Dec. 23, 2025

(54) SYSTEMS AND METHODS OF FACILITATING NAVIGATION OF AUTONOMOUS VEHICLES

(71) Applicant: Aarifah Tasnim Ullah, Woodbridge, VA (US)

(72) Inventor: Aarifah Tasnim Ullah, Woodbridge, VA (US)

( * ) Notice: Subject to any disclaimer, the term of this patent is extended or adjusted under 35 U.S.C. 154(b) by 0 days.

(21) Appl. No.: 19/297,912

(22) Filed: Aug. 12, 2025

(51) Int. Cl.
*G01C 21/00* (2006.01)
*G01C 21/34* (2006.01)

(52) U.S. Cl.
CPC .............................. *G01C 21/3453* (2013.01)

(58) Field of Classification Search
CPC ............................ G01C 21/3453; G01C 21/00
USPC ....................................................... 701/420
See application file for complete search history.

(56) References Cited

U.S. PATENT DOCUMENTS

| | | | |
|---|---|---|---|
| 6,473,692 B2 | 10/2002 | Hancock et al. | |
| 6,609,062 B2 | 8/2003 | Hancock | |
| 2014/0062754 A1 | 3/2014 | Mohamadi | |
| 2023/0213946 A1* | 7/2023 | Wyatt | G01C 21/005 |
| | | | 700/245 |

FOREIGN PATENT DOCUMENTS

WO 2016049357 A1 3/2016

OTHER PUBLICATIONS

Coverage Path Planning in Largescale Multi-floor Urban Environment, retrieved from the internet, retrieved on Aug. 7, 2025; <URL: https://www.diva-portal.org/smash/get/diva2:1683117/FULLTEXT01.pdf>.

* cited by examiner

*Primary Examiner* — Shardul D Patel

(57) ABSTRACT

The present disclosure provides a method of facilitating navigation of autonomous vehicles. The method may include receiving a reference data from a user device, analyzing the reference data, determining one or more bounded areas around a reference location based on the analyzing of the reference data, generating one or more two-dimensional grids based on the determining, transforming the two or more Cartesian coordinates using one or more mathematical transformation formulas, generating two or more geospatial coordinates based on the transforming, analyzing the two or more geospatial coordinates, determining, using the processing device, a navigation path based on the analyzing of the two or more geospatial coordinates, generating a navigation data based on the determining of the navigation path and transmitting, using the communication device, the navigation data to one or more autonomous vehicles associated with one or more missions.

20 Claims, 16 Drawing Sheets

SYSTEMS AND METHODS OF FACILITATING NAVIGATION OF AUTONOMOUS VEHICLES

FIELD OF DISCLOSURE

The present disclosure generally relates to the field of data processing. More specifically, the present disclosure relates to systems and methods of facilitating navigation of autonomous vehicles.

BACKGROUND

Autonomous navigation systems are integral to modern technological advancements, particularly in domains such as search and rescue operations, environmental monitoring, and aerial surveys. These systems rely heavily on accurate and adaptable geospatial waypoint generation to ensure efficient and safe operation of autonomous vehicles (AVs) and unmanned aerial vehicles (UAVs). The ability to navigate complex environments with high precision is crucial for maintaining mission integrity and minimizing operational costs.

Traditional navigation systems often employ static, pre-defined patterns that are ill-suited for dynamic real-world conditions. These systems may struggle to adapt to changing environmental factors such as terrain changes, obstacles, or mission-specific requirements. This rigidity can lead to inefficiencies, increased manual intervention, and potential inaccuracies in navigation, thereby limiting the effectiveness of autonomous missions.

Moreover, existing waypoint generation methods frequently lack the capability to integrate real-time data from onboard sensors, which could provide valuable feedback for dynamic adjustments. This limitation can result in suboptimal navigation decisions and reduced mission accuracy. Additionally, systems that employ fixed grid resolutions may lead to unnecessary computational overhead and reduced performance.

Traditional positioning systems such as GPS, GNSS, or RTK provide global coordinate mapping, but existing methods use these systems simplistically. The conventional approach typically requires manual entry of fixed waypoints or selection of generic patterns (e.g., circular, parallel tracking, sector searches) that avoid utilizing positioning systems entirely, and rely on directing the vehicle with relative position commands. These methods result in underutilization of AV capabilities and impose user limitations due to difficulty in precisely mapping points or adapting to new locations, especially crucial in mission-critical applications such as search and rescue. The limitations are compounded in adverse environmental conditions such as wind, current, or slippery surfaces, where commands like "move forward 10 units" lack the context of dynamic correction. Moreover, reusing patterns in different locations often requires complete reconfiguration.

Therefore, there is a need for improved systems and methods of facilitating navigation of autonomous vehicles that can overcome one or more of the preceding problems.

SUMMARY OF DISCLOSURE

This summary is provided to introduce a selection of concepts in a simplified form, that are further described below in the Detailed Description. This summary is not intended to identify key features or essential features of the claimed subject matter. Nor is this summary intended to be used to limit the claimed subject matter's scope.

The present disclosure provides a method of facilitating navigation of autonomous vehicles. Further, the method may include receiving, using a communication device, a reference data from a user device. Further, the reference data includes a reference geospatial coordinate defining a reference location. Further, the method may include analyzing, using a processing device, the reference data. Further, the method may include determining, using the processing device, one or more bounded areas around the reference location based on the analyzing of the reference data. Further, the method may include generating, using the processing device, one or more two-dimensional grids based on the determining. Further, the one or more two-dimensional grids include two or more Cartesian coordinates for the one or more bounded areas. Further, the method may include transforming, using the processing device, the two or more Cartesian coordinates using one or more mathematical transformation formulas. Further, the method may include generating, using the processing device, two or more geospatial coordinates based on the transforming. Further, the two or more geospatial coordinates indicate two or more geospatial locations of the one or more bounded areas. Further, the method may include analyzing, using the processing device, the two or more geospatial coordinates. Further, the method may include determining, using the processing device, a navigation path based on the analyzing of the two or more geospatial coordinates. Further, the method may include generating, using the processing device, a navigation data based on the determining of the navigation path. Further, the navigation data represents the navigation path. Further, the method may include transmitting, using the communication device, the navigation data to one or more autonomous vehicles associated with one or more missions. Further, the one or more autonomous vehicles may be configured for performing the one or more missions by navigating between the two or more geospatial coordinates based on the navigation path.

The present disclosure provides a system for facilitating navigation of autonomous vehicles. Further, the system may include a communication device. Further, the communication device may be configured for receiving a reference data from a user device. Further, the reference data includes a reference geospatial coordinate defining a reference location. Further, the communication device may be configured for transmitting a navigation data to one or more autonomous vehicles associated with one or more missions. Further, the one or more autonomous vehicles may be configured for performing the one or more missions by navigating between two or more geospatial coordinates based on a navigation path. Further, the system may include a processing device communicatively coupled with the communication device. Further, the processing device may be configured for analyzing the reference data. Further, the processing device may be configured for determining one or more bounded areas around the reference location based on the analyzing of the reference data. Further, the processing device may be configured for generating one or more two-dimensional grids based on the determining. Further, the one or more two-dimensional grids include two or more Cartesian coordinates for the one or more bounded areas. Further, the processing device may be configured for transforming the two or more Cartesian coordinates using one or more mathematical transformation formulas. Further, the processing device may be configured for generating the two or more geospatial coordinates based on the transforming.

Further, the two or more geospatial coordinates indicate two or more geospatial locations of the one or more bounded areas. Further, the processing device may be configured for analyzing the two or more geospatial coordinates. Further, the processing device may be configured for determining the navigation path based on the analyzing of the two or more geospatial coordinates. Further, the processing device may be configured for generating the navigation data based on the determining of the navigation path. Further, the navigation data represents the navigation path.

Both the foregoing summary and the following detailed description provide examples and are explanatory only. Accordingly, the foregoing summary and the following detailed description should not be considered to be restrictive. Further, features or variations may be provided in addition to those set forth herein. For example, embodiments may be directed to various feature combinations and subcombinations described in the detailed description.

BRIEF DESCRIPTIONS OF DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the applicants. The applicants retain and reserve all rights in their trademarks and copyrights included herein, and grant permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure.

DETAILED DESCRIPTION OF DISCLOSURE

Figure 1:
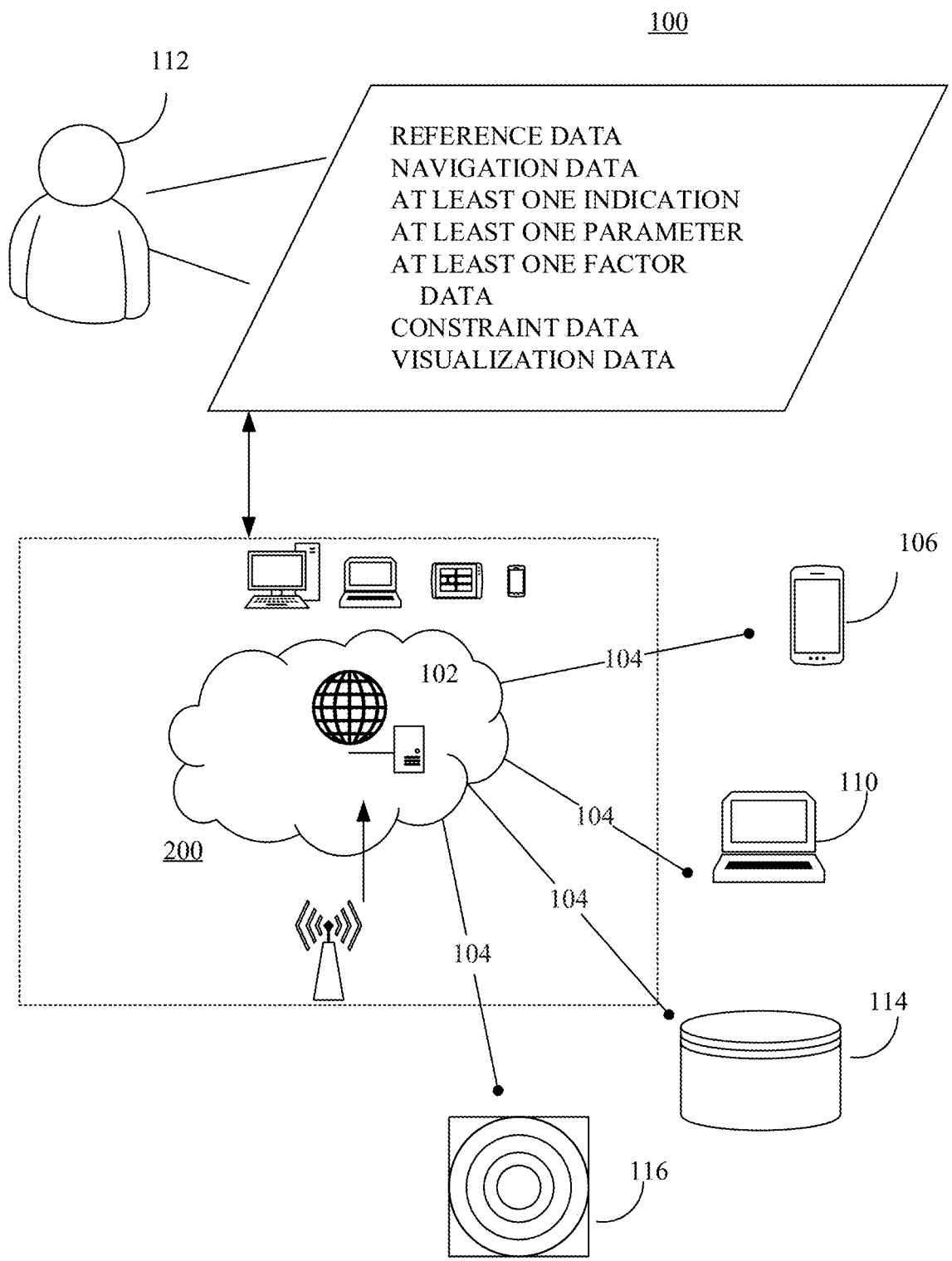
FIG. 1 is an illustration of an online platform 100 consistent with various embodiments of the present disclosure.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim limitation found herein and/or issuing here from that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present disclosure. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the claims found herein and/or issuing here from. The present disclosure contains headers. It should be understood that these headers are used as references and are not to be construed as limiting upon the subjected matter disclosed under the header.

The present disclosure includes many aspects and features. Moreover, while many aspects and features relate to, and are described in the context of the disclosed use cases, embodiments of the present disclosure are not limited to use only in this context.

In general, the method disclosed herein may be performed by one or more computing devices. For example, in some embodiments, the method may be performed by a server computer in communication with one or more client devices over a communication network such as, for example, the Internet. In some other embodiments, the method may be performed by one or more of at least one server computer, at least one client device, at least one network device, at least one sensor and at least one actuator. Examples of the one or more client devices and/or the server computer may include, a desktop computer, a laptop computer, a tablet computer, a personal digital assistant, a portable electronic device, a wearable computer, a smart phone, an Internet of Things (IoT) device, a smart electrical appliance, a video game console, a rack server, a super-computer, a mainframe computer, mini-computer, micro-computer, a storage server, an application server (e.g. a mail server, a web server, a real-time communication server, an FTP server, a virtual server, a proxy server, a DNS server etc.), a quantum computer, and so on. Further, one or more client devices and/or the server computer may be configured for executing a software application such as, for example, but not limited to, an operating system (e.g. Windows, Mac OS, Unix, Linux, Android, etc.) in order to provide a user interface (e.g. GUI, touch-screen based interface, voice based interface, gesture based interface etc.) for use by the one or more users and/or a network interface for communicating with other devices over a communication network. Accordingly, the server computer may include a processing device configured for performing data processing tasks such as, for example, but not limited to, analyzing, identifying, determining, generating, transforming, calculating, computing, compressing, decompressing, encrypting, decrypting, scrambling, splitting, merging, interpolating, extrapolating, redacting, anonymizing, encoding and decoding. Further, the server computer may include a communication device configured for communicating with one or more external devices. The one or more external devices may include, for example, but are not limited to, a client device, a third party database, public database, a private database and so on. Further, the communication device may be configured for communicating with the one or more external devices over one or more communication channels. Further, the one or more communication channels may include a wireless communication channel and/or a wired communication channel. Accordingly, the communication device may be configured for performing one or more of transmitting and receiving of information in electronic form. Further, the server computer may include a storage device configured for performing data storage and/or data retrieval operations. In general, the storage device may be configured for providing reliable storage of digital information. Accordingly, in some embodiments, the storage device may be based on technologies such as, but not limited to, data compression, data backup, data redundancy, deduplication, error correction, data fingerprinting, role based access control, and so on.

Further, one or more steps of the method disclosed herein may be initiated, maintained, controlled and/or terminated based on a control input received from one or more devices operated by one or more users such as, for example, but not limited to, an end user, an admin, a service provider, a service consumer, an agent, a broker and a representative thereof. Further, the user as defined herein may refer to a human, an animal or an artificially intelligent being in any state of existence, unless stated otherwise, elsewhere in the present disclosure. Further, in some embodiments, the one or more users may be required to successfully perform authentication in order for the control input to be effective. In general, a user of the one or more users may perform authentication based on the possession of a secret human readable secret data (e.g. username, password, passphrase, PIN, secret question, secret answer etc.) and/or possession of a machine readable secret data (e.g. encryption key, decryption key, bar codes, etc.) and/or or possession of one or more embodied characteristics unique to the user (e.g. biometric variables such as, but not limited to, fingerprint, palm-print, voice characteristics, behavioral characteristics, facial features, iris pattern, heart rate variability, evoked potentials, brain waves, and so on) and/or possession of a unique device (e.g. a device with a unique physical and/or chemical and/or biological characteristic, a hardware device with a unique serial number, a network device with a unique IP/MAC address, a telephone with a unique phone number, a smart-card with an authentication token stored thereupon, etc.). Accordingly, the one or more steps of the method may include communicating (e.g. transmitting and/or receiving) with one or more sensor devices and/or one or more actuators in order to perform authentication. For example, the one or more steps may include receiving, using the communication device, the secret human readable data from an input device such as, for example, a keyboard, a keypad, a touch-screen, a microphone, a camera and so on. Likewise, the one or more steps may include receiving, using the communication device, the one or more embodied characteristics from one or more biometric sensors.

Further, one or more steps of the method may be automatically initiated, maintained and/or terminated based on one or more predefined conditions. In an instance, the one or more predefined conditions may be based on one or more contextual variables. In general, the one or more contextual variables may represent a condition relevant to the performance of the one or more steps of the method. The one or more contextual variables may include, for example, but are not limited to, location, time, identity of a user associated with a device (e.g. the server computer, a client device etc.) corresponding to the performance of the one or more steps, environmental variables (e.g. temperature, humidity, pressure, wind speed, lighting, sound, etc.) associated with a device corresponding to the performance of the one or more steps, physical state and/or physiological state and/or psychological state of the user, physical state (e.g. motion, direction of motion, orientation, speed, velocity, acceleration, trajectory, etc.) of the device corresponding to the performance of the one or more steps and/or semantic content of data associated with the one or more users. Accordingly, the one or more steps may include communicating with one or more sensors and/or one or more actuators associated with the one or more contextual variables. For example, the one or more sensors may include, but are not limited to, a timing device (e.g. a real-time clock), a location sensor (e.g. a GPS receiver, a GLONASS receiver, an indoor location sensor etc.), a biometric sensor (e.g. a fingerprint sensor), an environmental variable sensor (e.g. temperature sensor, humidity sensor, pressure sensor, etc.) and a device state sensor (e.g. a power sensor, a voltage/current sensor, a switch-state sensor, a usage sensor, etc. associated with the device corresponding to performance of the or more steps).

Further, the one or more steps of the method may be performed one or more number of times. Additionally, the one or more steps may be performed in any order other than as exemplarily disclosed herein, unless explicitly stated otherwise, elsewhere in the present disclosure. Further, two or more steps of the one or more steps may, in some embodiments, be simultaneously performed, at least in part. Further, in some embodiments, there may be one or more time gaps between performance of any two steps of the one or more steps.

Further, in some embodiments, the one or more predefined conditions may be specified by the one or more users. Accordingly, the one or more steps may include receiving, using the communication device, the one or more predefined conditions from one or more and devices operated by the one or more users. Further, the one or more predefined conditions may be stored in the storage device. Alternatively, and/or additionally, in some embodiments, the one or more predefined conditions may be automatically determined, using the processing device, based on historical data corresponding to performance of the one or more steps. For example, the historical data may be collected, using the storage device, from a plurality of instances of performance of the method. Such historical data may include performance actions (e.g. initiating, maintaining, interrupting, terminating, etc.) of the one or more steps and/or the one or more contextual variables associated therewith. Further, machine learning may be performed on the historical data in order to determine the one or more predefined conditions. For instance, machine learning on the historical data may determine a correlation between one or more contextual variables and performance of the one or more steps of the method. Accordingly, the one or more predefined conditions may be generated, using the processing device, based on the correlation.

Further, one or more steps of the method may be performed at one or more spatial locations. For instance, the method may be performed by a plurality of devices interconnected through a communication network. Accordingly, in an example, one or more steps of the method may be performed by a server computer. Similarly, one or more steps of the method may be performed by a client computer. Likewise, one or more steps of the method may be performed by an intermediate entity such as, for example, a proxy server. For instance, one or more steps of the method may be performed in a distributed fashion across the plurality of devices in order to meet one or more objectives. For example, one objective may be to provide load balancing between two or more devices. Another objective may be to restrict a location of one or more of an input data, an output data and any intermediate data there between corresponding to one or more steps of the method. For example, in a client-server environment, sensitive data corresponding to a user may not be allowed to be transmitted to the server computer. Accordingly, one or more steps of the method operating on the sensitive data and/or a derivative thereof may be performed at the client device.

Overview:

The present disclosure describes systems and methods for generating, transforming, and executing waypoint-based navigation plans using mathematical coordinate transformations. The system is pertaining to the field of autonomous systems and vehicle navigation. The system provides a novel framework for mapping, planning, and deploying dynamic routes across multidimensional environments—land, sea, air, and sub-surface—by leveraging the conversion of Cartesian grid points into geospatial positioning coordinates, such as but not limited to GPS, GNSS, or RTK. This system is particularly relevant in the context of unmanned autonomous vehicles (UAVs, UGVs, USVs, UUVs) that require high-precision and adaptable routing capabilities in diverse and often unpredictable terrain or mission profiles. The disclosed system facilitates scalable, rapid, and user-minimal mission planning, with applications ranging from commercial drone operations to emergency response, environmental monitoring, and autonomous transportation.

The present disclosures describe the system and method for enhancing autonomous vehicle navigation by generating and assigning dynamic waypoints through a transformation process that maps standard coordinate systems—such as a Cartesian grid—onto geospatial systems like GPS, GNSS, or RTK. At its core, the system requires only a single input coordinate, typically a latitude and longitude point, which serves as the generation point for a series of unit-spaced positions that define a mission area. A mathematical formula is employed to translate each point in the Cartesian grid into corresponding geospatial coordinates, resulting in a highly adaptable and scalable waypoint structure.

This approach significantly streamlines mission planning and execution for autonomous vehicles, eliminating the need for manual waypoint placement. The system is capable of automatically generating a dense matrix of coordinates within a defined boundary and can support patterns that are either cyclic, repeating, or non-repeating and unique for each deployment. Parameters such as grid resolution, boundary size, and traversal logic can be modified in real-time, providing operational flexibility that adapts to evolving mission needs, environmental feedback, or strategic updates.

The system's architecture is designed to be lightweight and modular, enabling seamless integration with a wide range of autonomous platforms. These include, but are not limited to, unmanned aerial vehicles (UAVs), ground-based rovers, autonomous underwater vehicles (UUVs), maritime surface vessels, and space vehicles. Because the method relies on mathematical abstraction rather than hardware-specific implementation, it ensures cross-domain utility and supports diverse operational contexts such as search and rescue, precision agriculture, environmental monitoring, patrolling, surveillance and automated delivery services. This system not only increases the autonomy and intelligence of vehicle navigation systems but also reduces human workload, enhances mission accuracy, and facilitates broader use of autonomous technology in both commercial and defense applications.

Further, the method is a flexible system-agnostic navigation method that enables autonomous vehicles to dynamically generate and execute precise waypoint paths using a mathematical transformation between a unit-based Cartesian coordinate system and geospatial coordinate systems such as GPS (Global Positioning System), GNSS (Global Navigation Satellite System), or RTK (Real-Time Kinematics). Unlike prior art that relies on pre-defined or manually inserted waypoint sets, this system creates a flexible, scalable, and automated framework for waypoint generation based on a single geospatial reference point and a user-defined mathematical pattern.

The core of the system lies in the ability to superimpose a Cartesian grid over a real-world landmass by referencing latitude and longitude coordinates. Each Cartesian coordinate in the grid is mapped to a corresponding geospatial coordinate (e.g., GPS coordinate pair), using a transformation formula that accounts for unit distance, curvature, and local projection differences. The resulting navigation pattern can be finite or infinite, cyclic or non-repeating, simple or complex.

This method dramatically reduces manual workload, enables seamless deployment in new environments, and increases mission precision and adaptability-especially in high-stakes use cases like aerial surveys, search and rescue operations, and environmental monitoring.

System Architecture and Functional Components

The system comprises the following core functional modules:

1. Input Module:
   Accepts an initial user-defined GPS coordinate (latitude and longitude) representing the reference point. The system may also accept boundary parameters, desired unit resolution (e.g., 1 meter), and mission-specific constraints (e.g., time duration, area of interest).
2. Grid Generation Module:
   Establishes a Cartesian coordinate system anchored at the reference GPS point. This module calculates a set of evenly spaced Cartesian points (x, y) over a defined boundary (e.g., 10×10 unit grid) based on user-defined units (e.g., meters, feet).
3. Coordinate Transformation Module:
   Applies a mathematical transformation algorithm to convert each Cartesian point to a corresponding GPS coordinate. The transformation may rely on known landmass properties, local projection techniques, or direct application of equirectangular approximation, depending on required accuracy and environment.
4. Waypoint Path Generator:
   Defines the sequence in which generated waypoints will be visited. The pattern may be spiral, grid-sweep, serpentine, randomized, or determined by parametric equations or a dynamic logic function. The function may support cyclic or non-repeating sets and is configurable in real time.
5. Mission Control Interface:
   A user interface enables mission operators to define boundaries, change patterns on the fly, adjust unit spacing, and visualize generated waypoints on a map. It may also be used to send the generated waypoint file to the autonomous vehicle using formats compatible with autopilot systems.
6. Autonomous Execution Engine:
   The generated GPS waypoint list is transmitted to the autonomous vehicle's onboard navigation system. The vehicle then executes the mission using native path-following algorithms while relying on sensors for corrections related to drift, wind, or other environmental disturbances.

Operation

Step 1: Reference Point Input
   The user enters a single geospatial coordinate (latitude, longitude) representing the reference point of the pattern generation for the target operational area.

Step 2: Grid Generation and Boundary Definition
   The system defines a bounded area around the origin, shaped as a square, rectangle, or other user-defined polygon. The area is discretized into a grid where each point is spaced one unit (e.g., meter) apart, creating a structured coordinate matrix in (x, y) space.

Step 3: Geospatial Transformation
   Using a predefined formula, each Cartesian (x, y) coordinate is transformed into a latitude and longitude pair. This may use a projection approximation or an affine transformation that considers the curvature of the Earth and the properties of the local region.

Step 4: Waypoint Pattern Definition
   A navigation pattern function determines the order of waypoint visitation. This function can be simple (e.g., left-to-right rows) or complex (e.g., logarithmic spiral, zig-zag coverage, parametric curves). Patterns can be either finite or infinite, and time can optionally be used as a variable to produce time-sensitive paths.

Step 5: Mission Deployment
   The full list of generated waypoints is sent to the autonomous vehicle's mission planner. The vehicle's navigation stack interprets the GPS coordinates and executes the mission accordingly.

Step 6: Real-time Adjustments
   The user can reconfigure unit size, pattern logic, or boundaries during operation. The system updates the waypoint list and transmits it in real time, enabling on-the-fly tactical changes.

Advantages Over Prior Art
   Single Input Coordinate: Requires only one GPS coordinate to define an entire mission area.
   Dynamic Patterning: Waypoints are determined algorithmically, allowing for infinite customization without manual plotting.
   Precision and Consistency: The use of uniform unit steps in a Cartesian grid ensures consistent spatial coverage.
   Multi-Vehicle Applicability: Compatible with land, air, sea, submersible, and space autonomous systems.

Real-Time Adaptability: Parameters such as resolution, pattern type, and mission bounds can be adjusted during mission execution.

Use Case Example

Consider a UAV deployed for a search-and-rescue operation in a post-disaster scenario. The operator inputs the estimated center of the affected area as a single GPS coordinate. The system automatically generates a 500 m×500 m rectangular grid with 1-meter spacing, translating these into over 250,000 GPS coordinates. A Lissajous curve pattern is formed by two parameters selected to ensure complete area coverage with minimal overlap. During the mission, as new intel arrives suggesting a shift in the search area, the operator redefines the center point and narrows the grid to a 300 m×300 m area. The system recalculates and streams new coordinates to the UAV mid-flight without interrupting ongoing operations.

Vehicle Compatibility

This navigation system and methodology are designed for integration into a wide range of autonomous platforms, including:
- Unmanned Aerial Vehicles (UAVs): quadcopters, fixed-wing drones, VTOL platforms.
- Unmanned Ground Vehicles (UGVs): wheeled or tracked rovers.
- Unmanned Surface Vehicles (USVs): autonomous boats, rescue rafts.
- Unmanned Underwater Vehicles (UUVs): submersibles, survey drones.
- Other Autonomous Systems: autonomous cars, agricultural robots, delivery bots, and space rovers.

These platforms can integrate the system via onboard mission control systems or cloud-based fleet coordination platforms.

A method is disclosed for generating and executing geospatial navigation waypoints for an autonomous vehicle. The method involves receiving a single geospatial coordinate comprising latitude and longitude data that defines the reference location for mission planning. A two-dimensional Cartesian coordinate grid is then generated, comprising a plurality of unit-spaced points surrounding the reference location. Each point in the grid is spaced at a predefined distance from adjacent points within a boundary area surrounding the reference location. The Cartesian coordinates are transformed into geospatial coordinates by applying a mathematical transformation formula that accounts for landmass curvature, projection type, and unit scale. A navigation pattern is defined from among a plurality of selectable search strategies, determining the sequence in which the geospatial coordinates will be visited by the autonomous vehicle. The navigation pattern can be dynamically modified in real-time during mission execution. Finally, the set of transformed geospatial coordinates is transmitted to an autonomous vehicle navigation system for execution.

Further, the autonomous vehicle is enabled to detect and identify a region of interest or target. Upon detection, the vehicle stores the geospatial location of the target in memory and generates an updated navigation path optimized to approach or return from the region of interest.

Further, the navigation pattern is selected from a group consisting of, but not limited to, parametric curves, raster grid, serpentine, logarithmic spiral, randomized sweep, and dynamically condensed or expanded patterns based on the estimated size or shape of a target marker or terrain feature.

Further, the method includes assigning a first autonomous vehicle to conduct a scouting mission to search for a target marker, and upon detecting the marker, transmitting the marker's geospatial coordinates via wireless communication to a second autonomous vehicle designated to execute a follow-on task, including recovery, delivery, or rescue.

Further, a plurality of autonomous vehicles is deployed concurrently and configured to communicate with one another during mission execution, sharing status updates, target detections, and navigation adjustments in real-time to facilitate collaborative coverage and coordinated mission response.

Further, the geospatial waypoint data is formatted for compatibility with third-party autopilot systems, and the mission control interface exports the data in file formats.

Further, the resolution of the pattern and the spacing between individual waypoints are configurable parameters that may be adjusted in real-time based on mission factors such as vehicle battery levels, terrain elevation data, environmental conditions, or obstacle proximity detected via onboard sensors.

Further, the transformation of Cartesian coordinates to geospatial coordinates is performed using a mapping technique.

Further, the generated geospatial coordinates are indexed and stored in a lookup table, matrix, array, or database structure using their original Cartesian coordinate values, enabling rapid access for simulation, reuse, or mission replay purposes.

Further, the boundary area is defined by user input specifying a geometric shape, selected from the group consisting of a square, rectangle, circle, or polygon.

Further, the transformation formula accounts for curvature distortion at high latitudes by applying geographic correction factors. Further, the method includes selecting a navigation path order by applying a waypoint sequencing function based on parameters such as directionality, search priority, or operational constraints.

Further, the waypoint generation process executes dynamically in real-time, allowing pattern updates during mission runtime based on sensor feedback or mission control commands.

Further, the GPS waypoints are uploaded to an autonomous control module onboard a vehicle selected from the group consisting of UAVs, USVs, UGVs, and UUVs.

Further, at least one waypoint from the set of generated waypoints is designated for multiple revisits according to a user-defined logic, while remaining waypoints are assigned a single-visit traversal during the mission, with the ability to make repeated visits to multiple points of interest, or to never visit the same point again.

A system is disclosed for automated geospatial navigation and mission planning for autonomous vehicles. The system comprises a positioning module configured to receive and interpret a single geospatial coordinate comprising latitude and longitude data as a reference origin; a grid generation module configured to generate a two-dimensional Cartesian coordinate grid centered on the reference origin; a coordinate transformation module configured to apply a mathematical conversion formula to each Cartesian coordinate to generate a corresponding geospatial coordinate; a mission logic engine configured to define a traversal pattern through the geospatial coordinates based on a selected search strategy, with real-time pattern modification capability; and a vehicle interface module configured to transmit the set of transformed geospatial coordinates to one or more autonomous vehicles for execution.

Lissajous search mission. The drone's starting point is random. The only information the system need is the center of the field.

Lissajous curves are defined by two parametric equations:

$$[x,y] = <Ax*\sin(wx*t+\text{phix}), Ay*\sin(wy*t+\text{phiy})>$$

Ax=Amplitude in X-direction
Ay=Amplitude in Y-direction
wy=Angular frequency in X-dir
wy=Angular frequency in Y-dir
phix=Phase field shift in X-dir
phiy=Phase field shift in Y-dir Lissajous automatically bounds the field dimensions with Ax and Ay. A geofence will still be created for extra caution and fail-safe behavior. Adjusting the six parameters leads to infinitely many patterns. If ratio rw=rw/xy is rational, the curve is cyclical (repeating).

Irrational->the pattern doesn't ever repeat.
Latitude, longitude, altitude, heading.
Derivation:
Lissajous work:
Assigning a value for both (x,y) and checking for a result of the array indices $$(x,y)=(-8,2) \to [-8+10,-2+14]=[2,12]$$

$$(x,y)=(0,0) \to [14,10]$$

$$(x,y)=(3,4) \to [13,-4+14]=[13,10]$$

Generating longitude and latitude coordinates based on the fact of having one coordinate pair as the origin.
Need array indices from 0 to 28 for Y_AMP=14 so row is [29]=[2.Y_AMP+1]
Need array indices from 0 to 20 for X=AMP=20 so col is =[21]=[2.X_AMP+1]
[array[rows][columns]=array [2. Y_AMP+1][2.X_AMP+1]]

Generating longitude and latitude coordinates based on center point. Usually, latitude is approximately constant at all locations for km/degree. Further, longitude depends on latitude to find meter/deg.
of km/degree of longitude: π/180×(Radius_Earth) (cos (θ·π/180))
Θ=latitude in degrees
of m/degree of latitude: π/180×(Radius_Earth)=111 km/degree lat.
So, 1 degree of latitude have 111 km.
111 km/degree×1000 m/1 km=111,000 m/degree.
So, every 1 m, the degree changes by m=(1/(π/180·rad_earth))/1000
Earth radius=6378.137 km×1000=63,78,1370 meters.
110000 m/degree→9.09×10$^{-6}$ degree/meter
Further, km/degree varies near poles (111.699 km) or equator (110.567 km) or the earth.
[meters_latitude=(1/(π/180·rad_earth))/1000]→constant
Generating New Points
[new_latitude=old_latitude(centre point)+(lat_translation_meters)(meter_latitude)][lat_translation_meters→positive: move up
negative: move down]
lat_translation_meters→Movement of points in meters in latitude direction
Generating longitude relies on having the latitude, so it won't be making points n.vm.
[long_translation_meters→positive: move left
negative: move down]

long_translation_meters→Movement of points in meters in longitude direction
[meters_longitude=meters_latitude]
[new_longitude=old_longitude (centre point)+ (long_translation_meters)(meter_latitude)/cos (old_latitude*π/180]
Centre point (−35.363262, 149. 165237)
Lat=−35.363262
Long=149. 165237
Origin in array (0,0)→[Y_AMP, X_AMP]
The array is array [2. Y_AMP+1] [2.X_AMP+1]
Lissajous Search Mission
Four possible scenarios: ↑→, ↓←, ↑→, ↓→

```
1 2 3
4 5 6
7 8 9
``` for row in array:
  for cell in row: latitude=CENTER_LAT+ (lat_transaltion_ meters)·meters_latitude.
So, there is a need to figure out translation meters, all else is known.
Row [0→2.AMP_Y+1] the column values don't matter at all for latitude (Each row has the same latitude value, either going up or going down.
  lat_translation_meters=Y_AMP_row
[Y_AMP, X_AMP]=[CENTER_LAT, CENTER_LONG]

| Row | 14_Row |
|---|---|
| 0 | 14 |
| 1 | 13 |
| . | . |
| . | . |
| 20 | −6 |

To solve generating longitude coordinates,
[for row in range (0, rows):
  for col in range (0, cols):
    new_long=(INTER_LONG+(long_transaltion_meters)(meters_longitude)/cos (CENTER_LAT*π/180)]
[long_transaltion_meters=(X_AMP_col)]

| Col | 10-Col |
|---|---|
| 0 | 10 |
| 1 | 9 |
| . | 8 |
| . | . |
| 19 | −9 |

Further, the mission logic engine includes a protocol for separating vehicle roles, whereby a first vehicle performs target detection, and a second vehicle executes the optimized follow-on task based on shared data.

Further, the autonomous vehicles are selected from the group consisting of, but not limited to, unmanned aerial vehicles (UAVs), unmanned ground vehicles (UGVs), unmanned surface vehicles (USVs), and unmanned underwater vehicles (UUVs).

Further, the mission logic engine supports modification of search patterns in response to onboard sensor data indicating terrain slope, obstruction proximity, or environmental disturbance.

Further, the vehicle interface module supports wireless communication protocols for vehicle-to-vehicle or vehicle-to-human coordination, including sharing updated target locations, status signals, or re-tasking commands.

Further, a tracking module detects a moving target during the mission and dynamically adjusts the waypoint path of the autonomous vehicle or reassigns roles among vehicles based on the target's trajectory.

Further, the system software is hosted entirely within the autonomous vehicle's onboard computer, or alternatively hosted on a remote cloud-based platform with wireless synchronization to mission devices.

Further, a memory storage module is configured to retain past mission plans, grid definitions, and transformation logic for reuse in future missions or comparative analysis.

Further, the grid generator supports generating both high-resolution and low-resolution waypoint patterns to accommodate variations in target object size or terrain complexity. Further, when a target is detected by one autonomous vehicle within a group, the remaining vehicles within the group automatically terminate redundant search activities and synchronize mission roles accordingly through inter-vehicle communication protocols.

Further, the waypoint generation algorithm supports adjustments based on real-time environmental feedback from onboard sensors, including wind speed, elevation, or proximity sensing. Further, a memory unit is configured to store previously generated mission plans for rapid redeployment or simulation purposes. Further, a user interface for defining mission boundaries, center points, and selecting the shape and resolution of the search pattern. Further, the entire navigation and transformation system is hosted on a cloud-based control platform, enabling remote mission planning and vehicle dispatch.

Further, the coordinate transformation module includes a memory storing mathematical formulas used for conversion between Cartesian and GPS coordinates.

Further, the device comprises a microcontroller or onboard computer embedded within an autonomous vehicle and configured to execute the generated mission file.

Further, the transformation module includes calibration routines for aligning the Cartesian coordinate system with global GPS data in different geographic zones, with the adaptability and ability to move at different locations without affecting the mission.

Further, the method incorporates real-time pattern modification by allowing users to adjust the navigation path during mission execution. This is achieved through an adaptive transformation module that interprets input data from onboard sensors and environmental feedback systems. The system may utilize a dynamic path adjustment algorithm that updates the waypoint sequence based on real-time data such as terrain elevation changes or obstacles detected by LiDAR or vision-based systems.

Further, the transformation module may include a rule-based system that enables users to manually override certain waypoints in response to situational requirements.

Further, the system may utilize a variable-resolution grid generator that dynamically adjusts the granularity of the waypoint grid based on factors such as mission duration, vehicle speed, or detected obstacles. The resolution adjustment is performed by an optimization engine that considers terrain complexity and resource availability.

Further, the system may incorporate a distributed computing framework that facilitates data sharing between vehicles, allowing for collaborative path planning and resource allocation. Further, the communication module may include a decentralized decision-making algorithm that enables vehicles to adapt their navigation strategies based on shared information.

Further, the system may utilize sensor fusion techniques to combine data from multiple onboard sensors (e.g., GPS, LiDAR, IMU) to refine waypoint generation. Further, the sensor integration module may include a machine learning model that predicts potential navigation challenges and suggests course corrections.

Further, the system may utilize a neural network trained on historical navigation data to generate optimized waypoint sequences for specific mission profiles. Further, the AI module may include an adaptive learning algorithm that continuously updates its decision-making model based on real-time feedback from the vehicle's environment.

Further, the system may utilize a sensor fusion engine that combines data from GPS, LiDAR, IMU, and vision systems to generate highly accurate geospatial coordinates. Further, the fusion module may include an algorithm that correlates sensor data with historical navigation patterns to predict potential waypoints.

Further, the system may utilize a computer vision algorithm that detects and tracks moving obstacles in real-time, updating the navigation path accordingly. The obstacle detection module may include an adaptive learning algorithm that continuously updates its obstacle detection model based on new data from the vehicle's environment.

Further, the system may utilize a cloud computing platform that allows multiple vehicles to access and share waypoints in real-time, enabling coordinated mission planning. The sharing module may include an IoT-based communication system that enables waypoint updates via low-power wireless devices.

Further, the system may utilize a greedy algorithm that prioritizes waypoints with lower energy requirements, reducing overall vehicle fuel or battery usage. The routing module may include an optimization engine that dynamically adjusts the navigation path based on real-time energy feedback from vehicles.

FIG. 1 is an illustration of an online platform 100 consistent with various embodiments of the present disclosure. By way of non-limiting example, the online platform 100 may be hosted on a centralized server 102, such as, for example, a cloud computing service. The centralized server 102 may communicate with other network entities, such as, for example, a mobile device 106 (such as a smartphone, a laptop, a tablet computer etc.), other electronic devices 110 (such as desktop computers, server computers etc.), databases 114, and sensors 116 over a communication network 104, such as, but not limited to, the Internet. Further, users of the online platform 100 may include relevant parties such as, but not limited to, end-users, administrators, service providers, service consumers, and so on. Accordingly, in some instances, electronic devices operated by the one or more relevant parties may be in communication with the platform.

A user 112, such as the one or more relevant parties, may access online platform 100 through a web based software application or browser. The web based software application may be embodied as, for example, but not be limited to, a website, a web application, a desktop application, and a mobile application compatible with a computing device 200.

Figure 2:
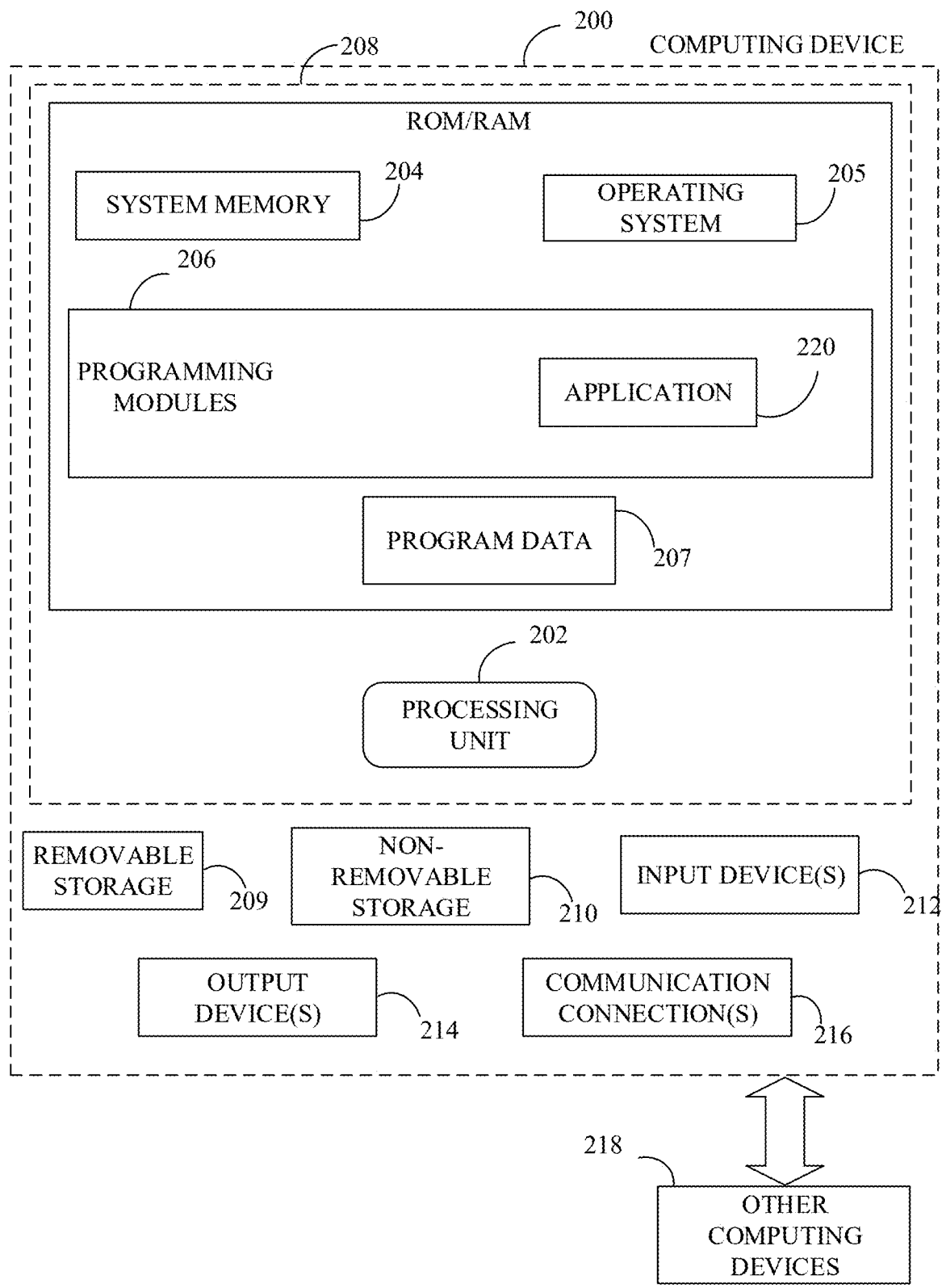
FIG. 2 is a block diagram of a computing device 200 for implementing the methods disclosed herein, in accordance with some embodiments.

With reference to FIG. 2, a system consistent with an embodiment of the disclosure may include a computing device or cloud service, such as computing device 200. In a basic configuration, computing device 200 may include at least one processing unit 202 and a system memory 204.

Depending on the configuration and type of computing device, system memory 204 may comprise, but is not limited to, volatile (e.g. random-access memory (RAM)), non-volatile (e.g. read-only memory (ROM)), flash memory, or any combination. System memory 204 may include operating system 205, one or more programming modules 206, and may include a program data 207. Operating system 205, for example, may be suitable for controlling computing device 200's operation. In one embodiment, programming modules 206 may include image-processing module, machine learning module. Furthermore, embodiments of the disclosure may be practiced in conjunction with a graphics library, other operating systems, or any other application program and is not limited to any particular application or system. This basic configuration is illustrated in FIG. 2 by those components within a dashed line 208.

Computing device 200 may have additional features or functionality. For example, computing device 200 may also include additional data storage devices (removable and/or non-removable) such as, for example, magnetic disks, optical disks, or tape. Such additional storage is illustrated in FIG. 2 by a removable storage 209 and a non-removable storage 210. Computer storage media may include volatile and non-volatile, removable and non-removable media implemented in any method or technology for storage of information, such as computer-readable instructions, data structures, program modules, or other data. System memory 204, removable storage 209, and non-removable storage 210 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 200. Any such computer storage media may be part of device 200. Computing device 200 may also have input device(s) 212 such as a keyboard, a mouse, a pen, a sound input device, a touch input device, a location sensor, a camera, a biometric sensor, etc. Output device(s) 214 such as a display, speakers, a printer, etc. may also be included. The aforementioned devices are examples and others may be used.

Computing device 200 may also contain a communication connection 216 that may allow device 200 to communicate with other computing devices 218, such as over a network in a distributed computing environment, for example, an intranet or the Internet. Communication connection 216 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 204, including operating system 205. While executing on processing unit 202, programming modules 206 (e.g., application 220 such as a media player) may perform processes including, for example, one or more stages of methods, algorithms, systems, applications, servers, databases as described above. The aforementioned process is an example, and processing unit 202 may perform other processes. Other programming modules that may be used in accordance with embodiments of the present disclosure may include machine learning applications.

Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, general purpose graphics processor-based systems, multiprocessor systems, microprocessor-based or programmable consumer electronics, application specific integrated circuit-based electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random-access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, solid state storage (e.g., USB drive), or a CD-ROM, a carrier wave from the Internet, or other forms of RAM or ROM. Further, the disclosed methods' stages may be modified in any manner, including by reordering stages and/or inserting or deleting stages, without departing from the disclosure.

Figure 3A:
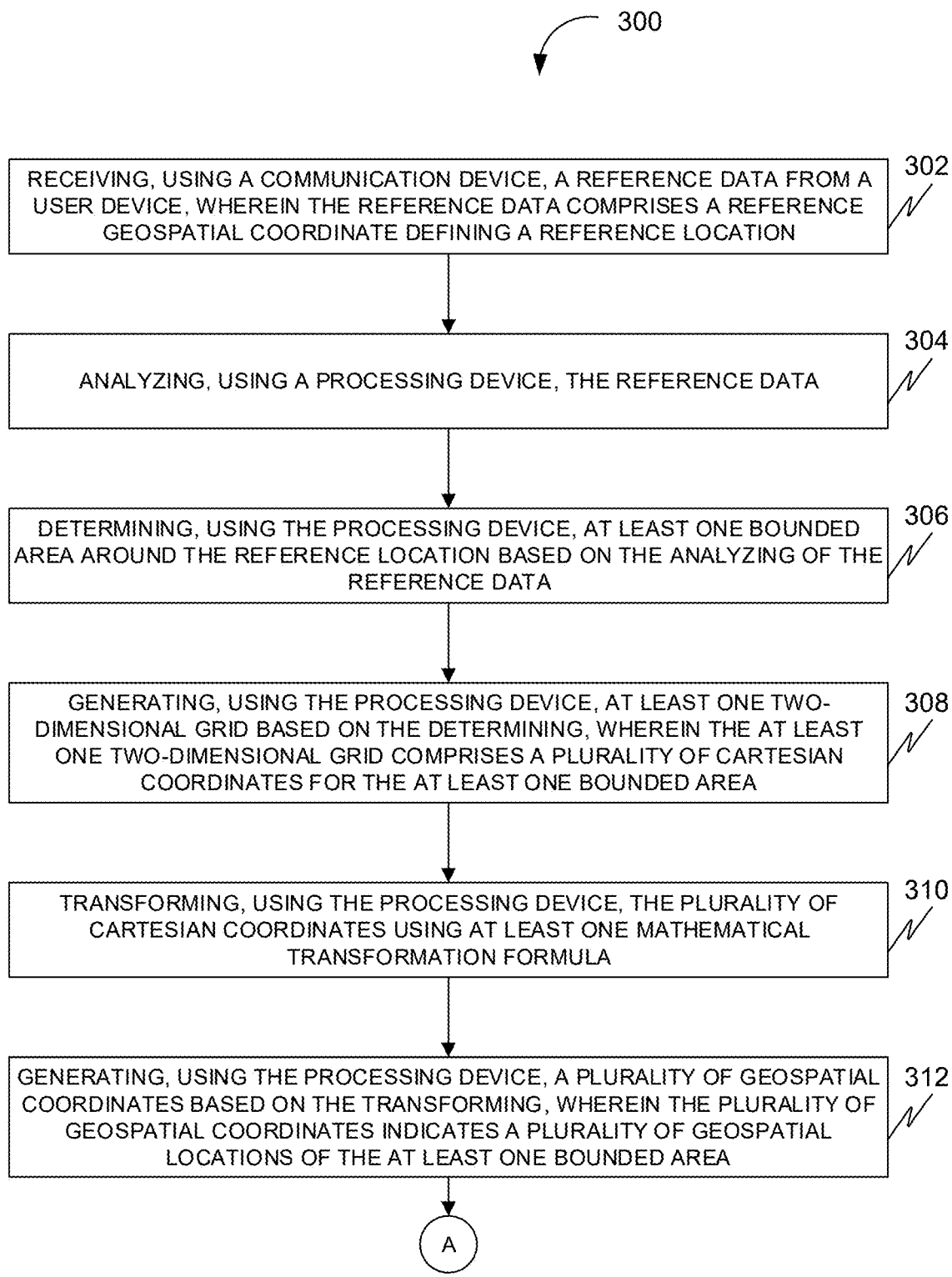
FIG. 3A illustrates a flowchart of a method 300 of facilitating navigation of autonomous vehicles, in accordance with some embodiments.
Figure 3B:
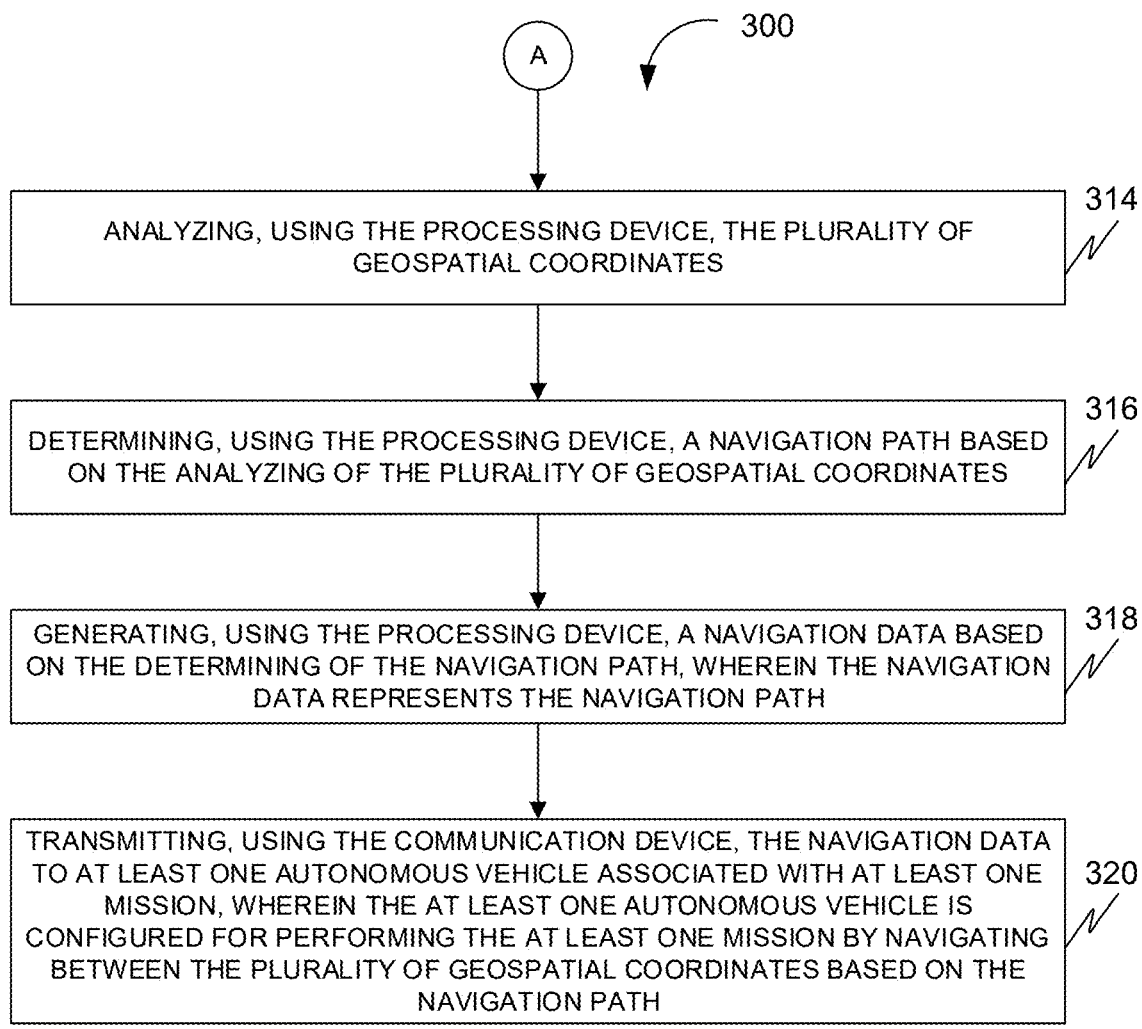
FIG. 3B illustrates a continuation of the flowchart of the method 300 of facilitating navigation of autonomous vehicles, in accordance with some embodiments.

FIG. 3A and FIG. 3B illustrate a flowchart of a method 300 of facilitating navigation of autonomous vehicles, in accordance with some embodiments.

Accordingly, the method 300 may include a step 302 of receiving, using a communication device 802, a reference data from a user device 902. Further, the reference data includes a reference geospatial coordinate defining a reference location. Further, the method 300 may include a step 304 of analyzing, using a processing device 804, the reference data. Further, the method 300 may include a step 306 of determining, using the processing device 804, one or more bounded areas around the reference location based on the analyzing of the reference data. Further, the method 300 may include a step 308 of generating, using the processing device 804, one or more two-dimensional grids based on the determining. Further, the one or more two-dimensional grids include two or more Cartesian coordinates for the one or more bounded areas. Further, the method 300 may include a step 310 of transforming, using the processing device 804, the two or more Cartesian coordinates using one or more mathematical transformation formulas. Further, the method 300 may include a step 312 of generating, using the processing device 804, two or more geospatial coordinates based on the transforming. Further, the two or more geospatial coordinates indicate two or more geospatial locations of the one or more bounded areas. Further, the method 300 may include a step 314 of analyzing, using the processing device 804, the two or more geospatial coordinates. Further, the method 300 may include a step 316 of determining, using the processing device 804, a navigation path based on the analyzing of the two or more geospatial coordinates. Further, the method 300 may include a step 318 of generating, using the processing device 804, a navigation data based on the determining of the navigation path. Further, the navigation data represents the navigation path. Further, the method 300 may include a step 320 of transmitting, using the communication device 802, the navigation data to one or more autonomous vehicles 904 associated with one or more missions. Further, the one or more autonomous vehicles 904 may be configured for performing the one or more missions by navigating between the two or more geospatial coordinates based on the navigation path.

Figure 4:
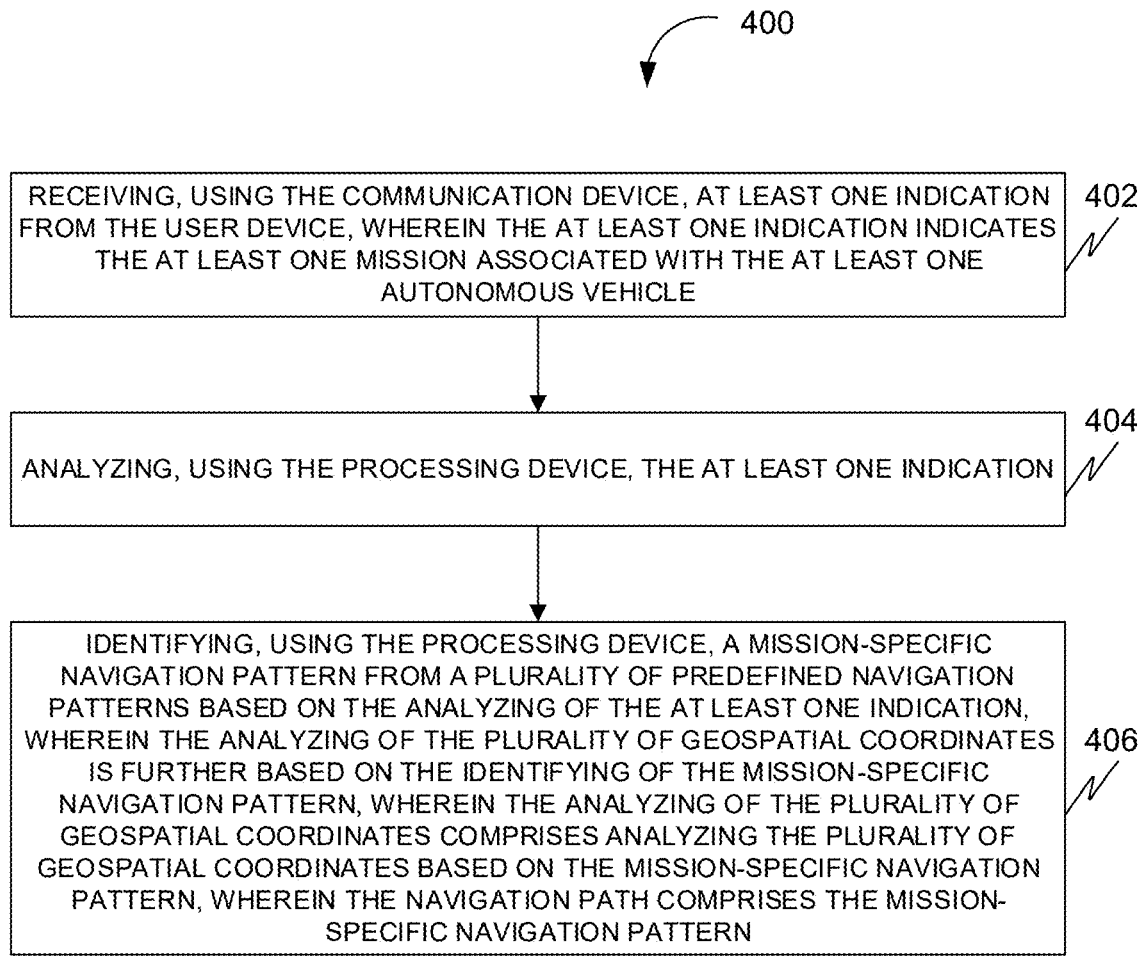
FIG. 4 illustrates a flowchart of a method 400 of facilitating navigation of autonomous vehicles including identifying, using the processing device 804, a mission-specific navigation pattern from a plurality of predefined navigation patterns, in accordance with some embodiments.

FIG. 4 illustrates a flowchart of a method 400 of facilitating navigation of autonomous vehicles including identifying, using the processing device 804, a mission-specific navigation pattern from a plurality of predefined navigation patterns, in accordance with some embodiments.

Further, in some embodiments, the method 400 further may include a step 402 of receiving, using the communication device 802, one or more indications from the user device 902. Further, the one or more indications indicate the one or more missions associated with the one or more autonomous vehicles 904. Further, in some embodiments, the method 400 further may include a step 404 of analyzing, using the processing device 804, the one or more indications. Further, in some embodiments, the method 400 further may include a step 406 of identifying, using the processing device 804, a mission-specific navigation pattern from two or more predefined navigation patterns based on the analyzing of the one or more indications. Further, the analyzing of the two or more geospatial coordinates may be further based on the identifying of the mission-specific navigation pattern. Further, the analyzing of the two or more geospatial coordinates include analyzing the two or more geospatial coordinates based on the mission-specific navigation pattern. Further, the navigation path includes the mission-specific navigation pattern.

Further, in some embodiments, the transforming of the two or more Cartesian coordinates may include transforming the two or more Cartesian coordinates using a coordinate transformation module. Further, the coordinate transformation module may be configured for applying the one or more mathematical transformation formulas to each of the two or more Cartesian coordinates. Further, the coordinate transformation module may be configured for performing one or more of a projection approximation and an affine transformation of each of the two or more Cartesian coordinates based on the applying of the one or more mathematical transformation formulas. Further, the generating of the two or more geospatial coordinates may be further based on the performing of one or more of the projection approximation and the affine transformation.

Figure 5:
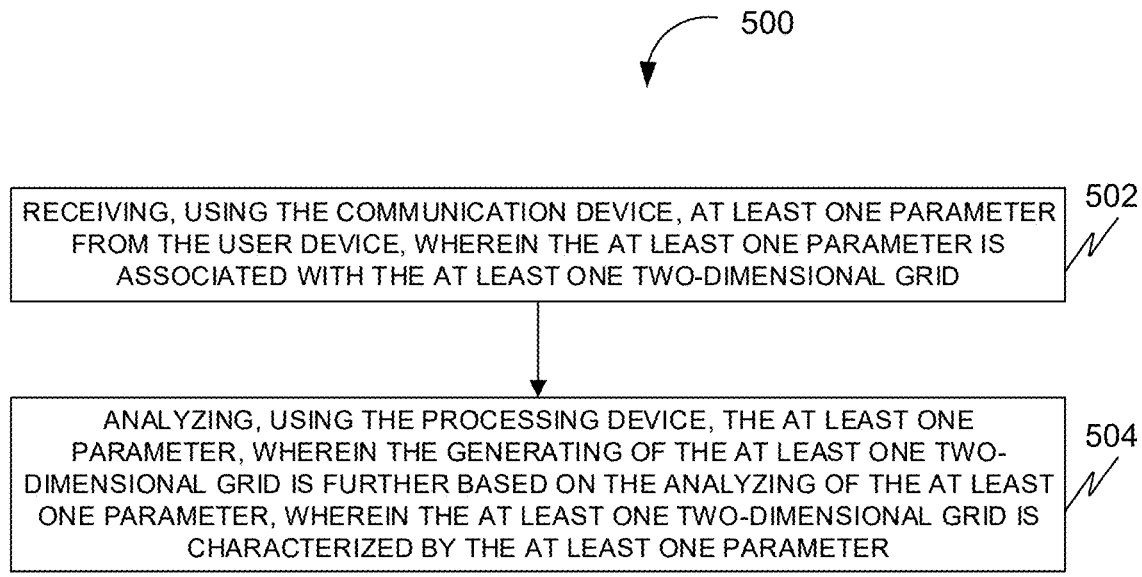
FIG. 5 illustrates a flowchart of a method 500 of facilitating navigation of autonomous vehicles including analyzing, using the processing device 804, the at least one parameter, in accordance with some embodiments.

FIG. 5 illustrates a flowchart of a method 500 of facilitating navigation of autonomous vehicles including analyzing, using the processing device 804, the at least one parameter, in accordance with some embodiments.

Further, in some embodiments, the method 500 further may include a step 502 of receiving, using the communication device 802, one or more parameters from the user device 902. Further, the one or more parameters may be associated with the one or more two-dimensional grids. Further, in some embodiments, the method 500 further may include a step 504 of analyzing, using the processing device 804, the one or more parameters. Further, the generating of the one or more two-dimensional grids may be further based on the analyzing of the one or more parameters. Further, the one or more two-dimensional grids may be characterized by the one or more parameters.

Figure 6:
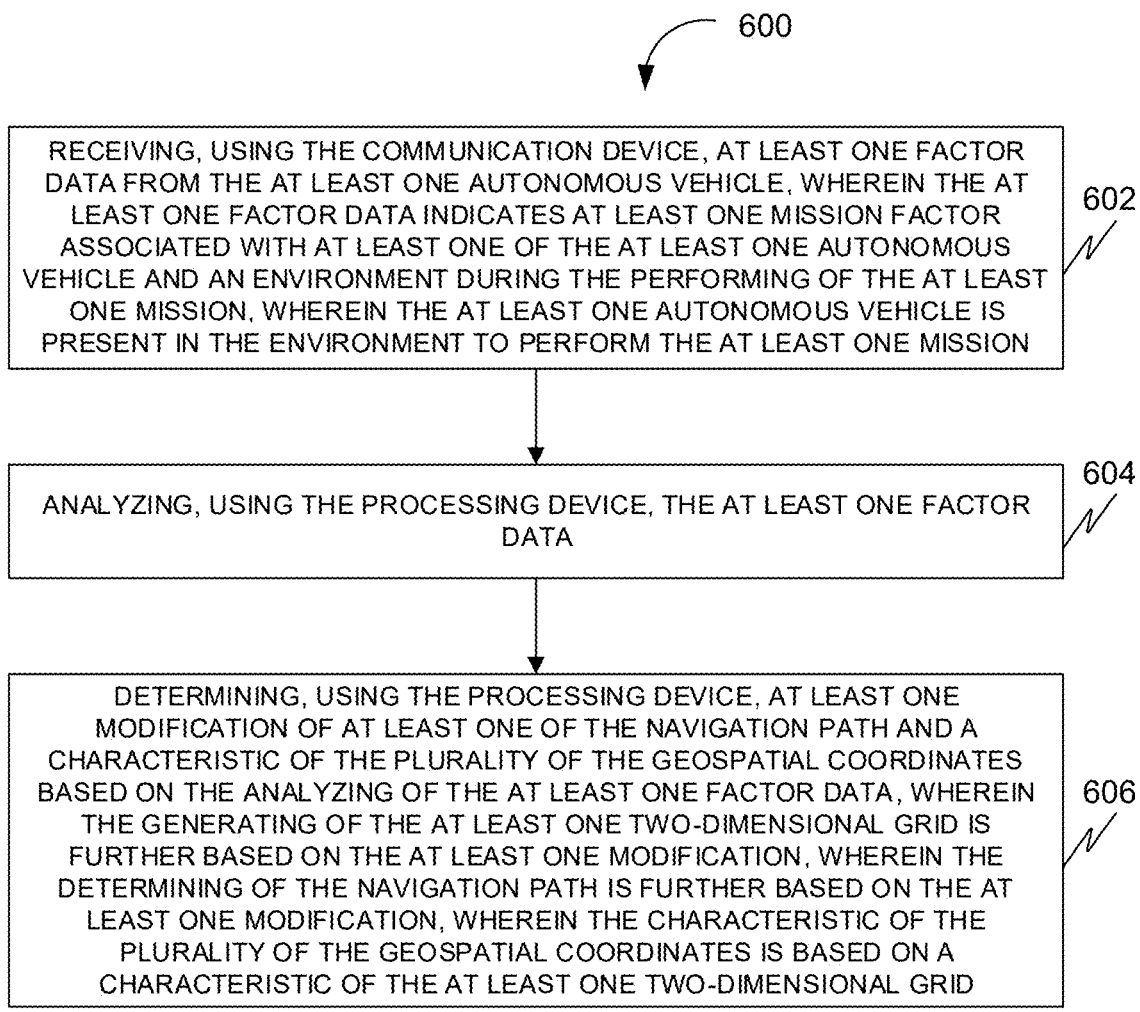
FIG. 6 illustrates a flowchart of a method 600 of facilitating navigation of autonomous vehicles including determining, using the processing device 804, at least one modification of at least one of the navigation path and a characteristic of the plurality of the geospatial coordinates, in accordance with some embodiments.

FIG. 6 illustrates a flowchart of a method 600 of facilitating navigation of autonomous vehicles including determining, using the processing device 804, at least one modification of at least one of the navigation path and a characteristic of the plurality of the geospatial coordinates, in accordance with some embodiments.

Further, in some embodiments, the method 600 further may include a step 602 of receiving, using the communication device 802, one or more factor data from the one or more autonomous vehicles 904. Further, the one or more factor data indicates one or more mission factors associated with one or more of the one or more autonomous vehicles 904 and an environment during the performing of the one or more missions. Further, the one or more autonomous vehicles 904 may be present in the environment to perform the one or more missions. Further, in some embodiments, the method 600 further may include a step 604 of analyzing, using the processing device 804, the one or more factor data. Further, in some embodiments, the method 600 further may include a step 606 of determining, using the processing device 804, one or more modifications of one or more of the navigation path and a characteristic of the plurality of the geospatial coordinates based on the analyzing of the one or more factor data. Further, the generating of the one or more two-dimensional grids may be further based on the one or more modifications. Further, the determining of the navigation path may be further based on the one or more modifications. Further, the characteristic of the plurality of the geospatial coordinates may be based on a characteristic of the one or more two-dimensional grids.

In some embodiments, the generating of the one or more two-dimensional grids includes generating the one or more two-dimensional grids using a grid generation module based on the determining of the one or more bounded areas. Further, the grid generation module may be configured for determining a spacing between two or more grid lines associated with two or more axes of a Cartesian coordinate system. Further, the two or more axes may be mutually perpendicular. Further, the spacing includes an even spacing between the two or more grid lines. Further, the generating of the one or more two-dimensional grids may be further based on the determining of the spacing.

Figure 7:
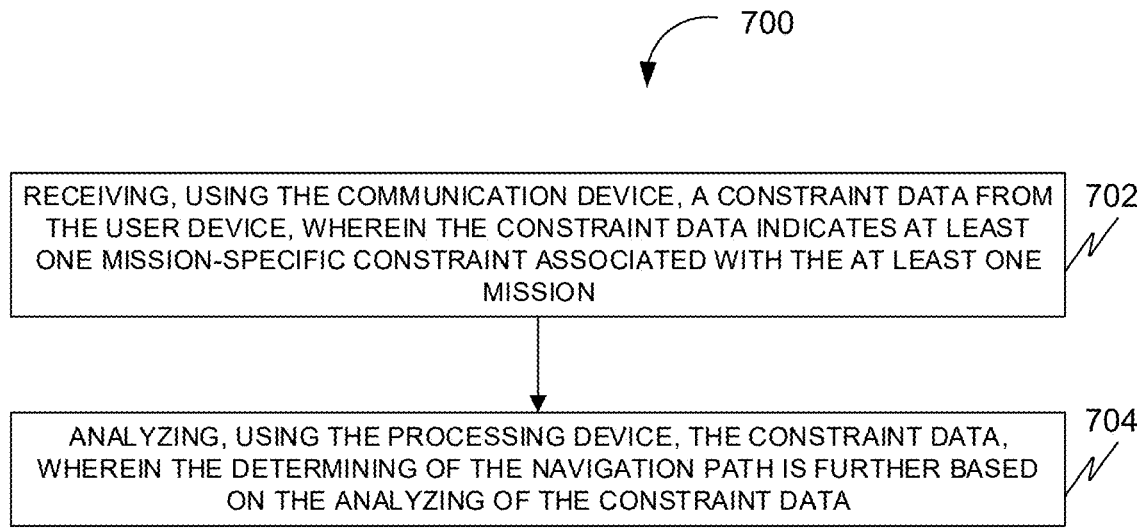
FIG. 7 illustrates a flowchart of a method 700 of facilitating navigation of autonomous vehicles including analyzing, using the processing device 804, the constraint data, in accordance with some embodiments.

FIG. 7 illustrates a flowchart of a method 700 of facilitating navigation of autonomous vehicles including analyzing, using the processing device 804, the constraint data, in accordance with some embodiments.

Further, in some embodiments, the method 700 further may include a step 702 of receiving, using the communication device 802, a constraint data from the user device 902. Further, the constraint data indicates one or more mission-specific constraints associated with the one or more missions. Further, in some embodiments, the method 700 further may include a step 704 of analyzing, using the processing device 804, the constraint data. Further, the determining of the navigation path may be further based on the analyzing of the constraint data.

In some embodiments, the coordinate transformation module may be further configured for performing an equirectangular approximation based on the applying of the one or more mathematical transformation formulas. Further, the generating of the two or more geospatial coordinates may be based on the performing of the equirectangular approximation.

Further, in some embodiments, the transforming of the two or more Cartesian coordinates may include applying one or more geographical correction factors to one or more of the two or more Cartesian coordinates. Further, the transforming of the two or more Cartesian coordinates may include correcting one or more curvature distortions associated with one or more of the two or more Cartesian coordinates based on the applying of the one or more geographical correction factors. Further, the generating of the two or more geospatial coordinates may be further based on the correcting of the one or more curvature distortions.

In some embodiments, the analyzing of the two or more geospatial coordinates includes applying one or more waypoint sequencing functions to the two or more geospatial coordinates. Further, the one or more waypoint sequencing functions consider one or more sequencing parameters associated with one or more of the one or more missions and the one or more autonomous vehicles 904. Further, the determining of the navigation path may be based on the applying of the one or more waypoint sequencing functions.

Figure 8:
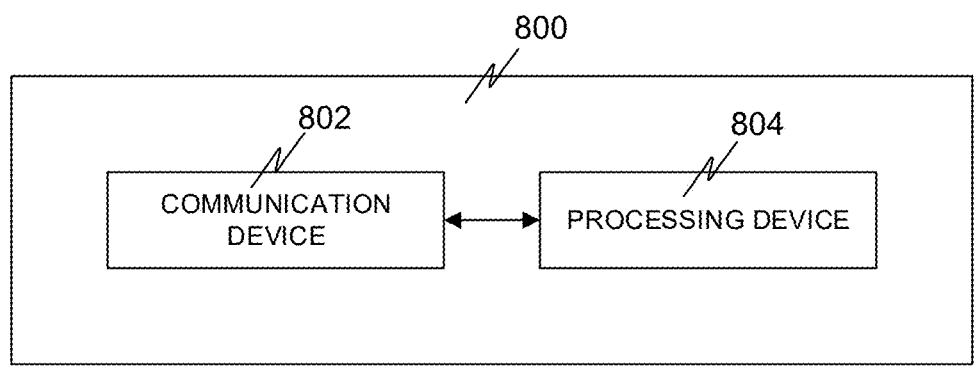
FIG. 8 illustrates a block diagram of a system 800 of facilitating navigation of autonomous vehicles, in accordance with some embodiments.

FIG. 8 illustrates a block diagram of a system 800 of facilitating navigation of autonomous vehicles, in accordance with some embodiments.

Accordingly, the system 800 may include a communication device 802. Further, the communication device 802 may be configured for receiving a reference data from a user device 902. Further, the reference data includes a reference geospatial coordinate defining a reference location. Further, the communication device 802 may be configured for transmitting a navigation data to one or more autonomous vehicles 904 associated with one or more missions. Further, the one or more autonomous vehicles 904 may be configured for performing the one or more missions by navigating between two or more geospatial coordinates based on a navigation path. Further, the system 800 may include a processing device 804 communicatively coupled with the communication device 802. Further, the processing device 804 may be configured for analyzing the reference data. Further, the processing device 804 may be configured for determining one or more bounded areas around the reference location based on the analyzing of the reference data. Further, the processing device 804 may be configured for generating one or more two-dimensional grids based on the determining. Further, the one or more two-dimensional grids include two or more Cartesian coordinates for the one or more bounded areas. Further, the processing device 804 may be configured for transforming the two or more Cartesian coordinates using one or more mathematical transformation formulas. Further, the processing device 804 may be configured for generating the two or more geospatial coordinates based on the transforming. Further, the two or more geospatial coordinates indicate two or more geospatial locations of the one or more bounded areas. Further, the processing device 804 may be configured for analyzing the two or more geospatial coordinates. Further, the processing device 804 may be configured for determining the navigation path based on the analyzing of the two or more geospatial coordinates. Further, the processing device 804 may be configured for generating the navigation data based on the determining of the navigation path. Further, the navigation data represents the navigation path.

Figure 9:
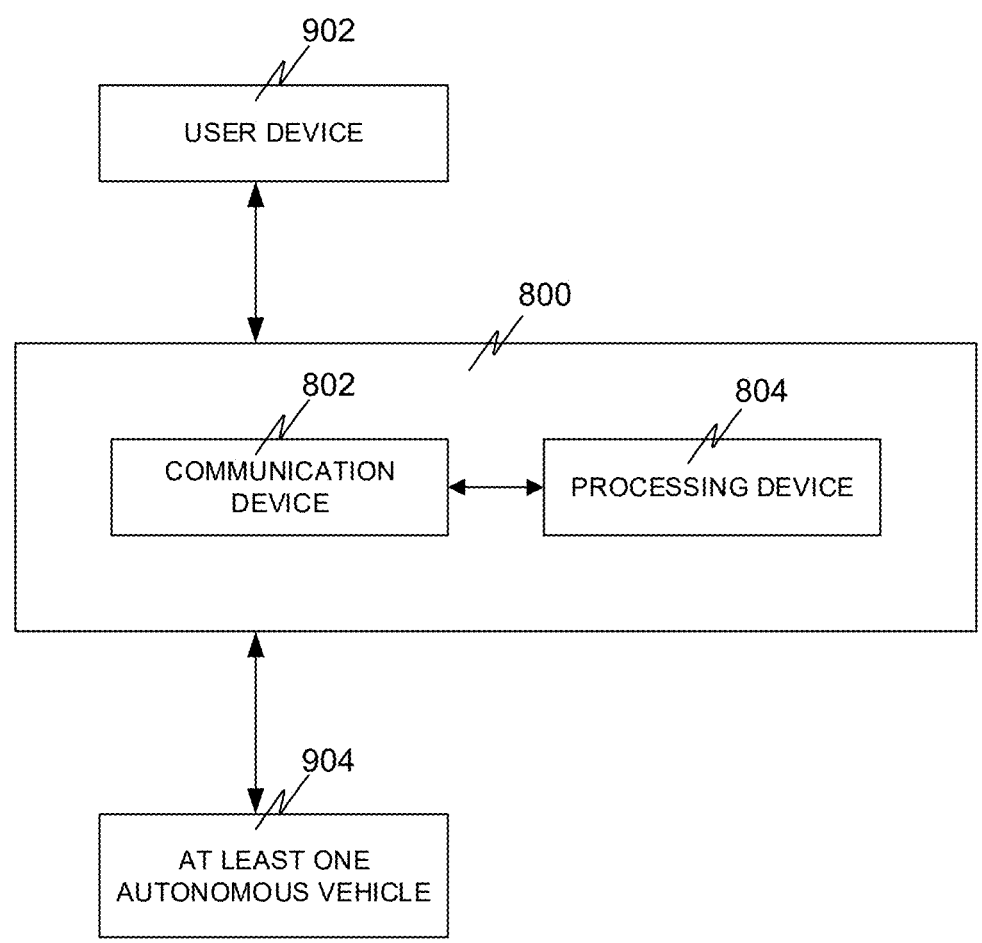
FIG. 9 illustrates a block diagram of the system 800 of facilitating navigation of autonomous vehicles, in accordance with some embodiments.

FIG. 9 illustrates a block diagram of the system 800 of facilitating navigation of autonomous vehicles, in accordance with some embodiments.

Further, in some embodiments, the communication device 802 may be further configured for receiving one or more indications from the user device 902. Further, the one or more indications indicate the one or more missions associated with the one or more autonomous vehicles 904. Further, the processing device 804 may be further configured for analyzing the one or more indications. Further, the communication device 802 may be further configured for receiving one or more indications from the user device 902. Further, the processing device 804 may be further configured for identifying a mission-specific navigation pattern from two or more predefined navigation patterns based on the analyzing of the one or more indications. Further, the analyzing of the two or more geospatial coordinates may be further based on the identifying of the mission-specific navigation pattern. Further, the analyzing of the two or more geospatial coordinates includes analyzing the two or more geospatial coordinates based on the mission-specific navigation pattern. Further, the navigation path includes the mission-specific navigation pattern.

Further, in some embodiments, the transforming of the two or more Cartesian coordinates may include transforming the two or more Cartesian coordinates using a coordinate transformation module. Further, the coordinate transformation module may be configured for applying the one or more mathematical transformation formulas to each of the two or more Cartesian coordinates. Further, the coordinate transformation module may be configured for performing one or more of a projection approximation and an affine transformation of each of the two or more Cartesian coordinates based on the applying of the one or more mathematical transformation formulas. Further, the generating of the two or more geospatial coordinates may be further based on the performing of one or more of the projection approximation and the affine transformation.

In some embodiments, the communication device 802 may be further configured for receiving one or more parameters from the user device 902. Further, the one or more parameters may be associated with the one or more two-dimensional grids. Further, the processing device 804 may be further configured for analyzing the one or more parameters. Further, the generating of the one or more two-dimensional grids may be further based on the analyzing of the one or more parameters. Further, the one or more two-dimensional grids may be characterized by the one or more parameters.

Further, in some embodiments, the communication device 802 may be further configured for receiving one or more factor data from the one or more autonomous vehicles 904. Further, the one or more factor data indicates one or more mission factors associated with one or more of the one or more autonomous vehicles 904 and an environment during the performing of the one or more missions. Further, the one or more autonomous vehicles 904 may be present in the environment to perform the one or more missions. Further, the processing device 804 may be further configured for analyzing the one or more factor data. Further, the one or more factor data indicates one or more mission factors associated with one or more of the one or more autonomous vehicles 904 and an environment during the performing of the one or more missions. Further, the processing device 804 may be further configured for determining one or more modifications of one or more of the navigation path and a characteristic of the plurality of the geospatial coordinates based on the analyzing of the one or more factor data. Further, the generating of the one or more two-dimensional grids may be further based on the one or more modifications. Further, the determining of the navigation path may be further based on the one or more modifications. Further, the characteristic of the plurality of the geospatial coordinates may be based on a characteristic of the one or more two-dimensional grids.

In some embodiments, the generating of the one or more two-dimensional grids includes generating the one or more two-dimensional grids using a grid generation module based on the determining of the one or more bounded areas. Further, the grid generation module may be configured for determining a spacing between two or more grid lines associated with two or more axes of a Cartesian coordinate system. Further, the two or more axes may be mutually perpendicular. Further, the spacing includes an even spacing between the two or more grid lines. Further, the generating of the one or more two-dimensional grids may be further based on the determining of the spacing.

In some embodiments, the communication device 802 may be further configured for receiving a constraint data from the user device 902. Further, the constraint data indicates one or more mission-specific constraints associated with the one or more missions. Further, the processing device 804 may be further configured for analyzing the constraint data. Further, the determining of the navigation path may be further based on the analyzing of the constraint data.

In some embodiments, the coordinate transformation module may be further configured for performing an equirectangular approximation based on the applying of the one or more mathematical transformation formulas. Further, the generating of the two or more geospatial coordinates may be based on the performing of the equirectangular approximation.

Further, in some embodiments, the transforming of the two or more Cartesian coordinates may include applying one or more geographical correction factors to one or more of the two or more Cartesian coordinates. Further, the transforming of the two or more Cartesian coordinates may include correcting one or more curvature distortions associated with one or more of the two or more Cartesian coordinates based on the applying of the one or more geographical correction factors. Further, the generating of the two or more geospatial coordinates may be further based on the correcting of the one or more curvature distortions.

In some embodiments, the analyzing of the two or more geospatial coordinates include applying one or more waypoint sequencing functions to the two or more geospatial coordinates. Further, the one or more waypoint sequencing functions consider one or more sequencing parameters associated with one or more of the one or more missions and the one or more autonomous vehicles 904. Further, the determining of the navigation path may be based on the applying of the one or more waypoint sequencing functions.

In some embodiments, the one or more autonomous vehicles 904 include an unmanned autonomous vehicle.

In some embodiments, the unmanned autonomous vehicle includes one or more of an unmanned aerial vehicle (UAV), an unmanned ground vehicle (UGV), an unmanned underwater vehicle (UUV), and an unmanned surface vehicle (USV).

In some embodiments, the autonomous vehicle includes one or more of a ground-based rover, a quadcopter, a fixed-wing drone, a wheeled rover, a tracked rover, an autonomous boat, a rescue raft, a submersible, a survey drone, an autonomous car, an agriculture robot, a delivery bot, a maritime surface vessel, and a space vehicle.

In some embodiments, the reference geospatial coordinate includes a reference latitude and longitude pair of the reference location.

In some embodiments, the one or more bounded areas correspond to an area defined by one or more boundaries.

In some embodiments, the two or more geospatial coordinates include two or more latitude and longitude pairs of the two or more geospatial locations.

In some embodiments, the two or more geospatial coordinates may include two or more Global Positioning System (GPS) coordinates.

In some embodiments, the two or more geospatial coordinates may be associated with a geospatial coordinate system comprising one or more of a global positioning system (GPS), a Global Navigation Satellite System (GNSS), and a Real-Time Kinematics (RTK) system.

In some embodiments, the two or more grid lines include each of a first grid line, a second grid line, and a third grid line. Further, the second grid line may be adjacent to each of the first grid line and the third grid line. Further, the spacing between the first grid line and the second grid line may be characterized by a first value. Further, the spacing between the second grid line and the third grid line may be characterized by a second value. Further, the first value and the second value may be the same.

In some embodiments, the one or more parameters include a boundary parameter and a unit of a resolution of the at least one two-dimensional grid.

In some embodiments, the one or more two-dimensional grids are characterized by a boundary with the boundary parameter.

In some embodiments, the two or more Cartesian coordinates include each of a first Cartesian coordinate and a second Cartesian coordinate. Further, the first Cartesian coordinate may be adjacent to the second Cartesian coordinate. Further, a spacing between the first Cartesian coordinate and the second Cartesian coordinate may be characterized by the unit.

In some embodiments, the unit includes one or more of meter and feet.

In some embodiments, the coordinate transformation module may be configured to consider one or more landmass properties associated with the one or more bounded areas.

In some embodiments, the determining of the navigation path includes determining a sequence of the two or more geographical coordinates. Further, the generating of the navigation data may be based on the determining of the sequence of the two or more geographical coordinates. Further, the one or more autonomous vehicles navigate between the two or more geospatial coordinates based on the sequence.

In some embodiments, the two or more predefined navigation patterns include a spiral pattern, a grid-sweep pattern, a parametric curve, a raster grid, a serpentine, and a randomized pattern.

In some embodiments, the determining of the navigation path includes determining the navigation path using one or more of one or more parametric equations and one or more dynamic logic functions. Further, the generating of the navigation data may be based on the determining of the navigation path using one or more of the one or more parametric equations and the one or more dynamic logic functions.

In some embodiments, the one or more dynamic logic functions support at least one a cyclic navigation path and a non-repeating navigation path.

In some embodiments, the one or more mission-specific constraints correspond to one or more of a time duration of the one or more mission.

In some embodiments, the one or more mission-specific constraints correspond to one or more of an area of interest.

In some embodiments, the characteristics of the two or more geospatial coordinates may include a spacing between the two or more geospatial coordinates in one or more two-dimensional grids.

Figure 10:
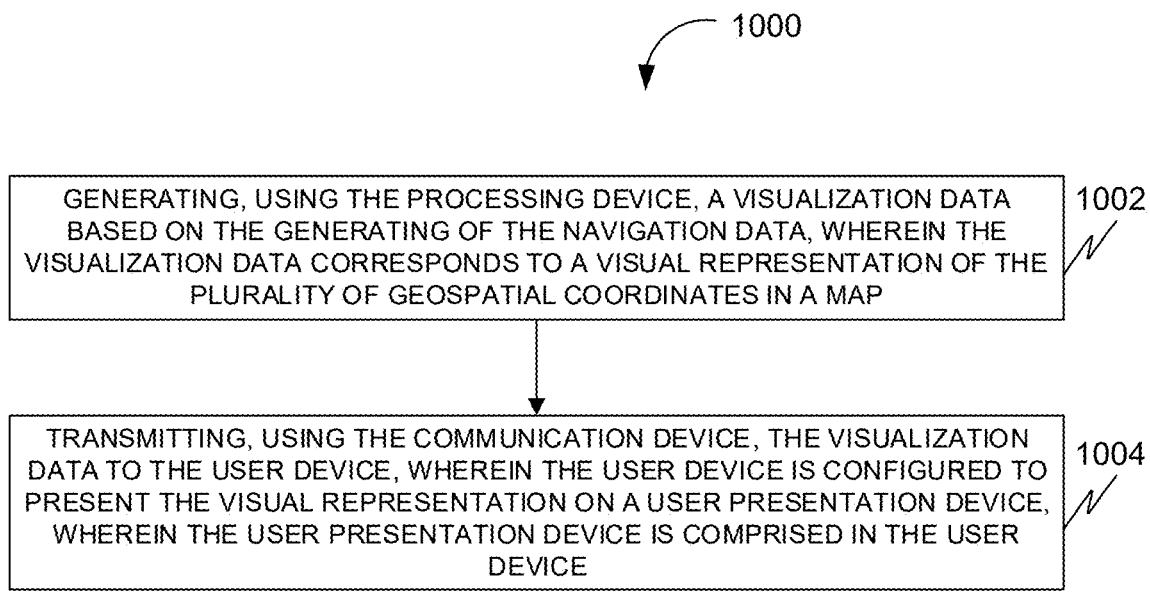
FIG. 10 illustrates a flowchart of a method 1000 of facilitating navigation of autonomous vehicles including generating, using the processing device 804, a visualization data, in accordance with some embodiments.
Figure 11A:
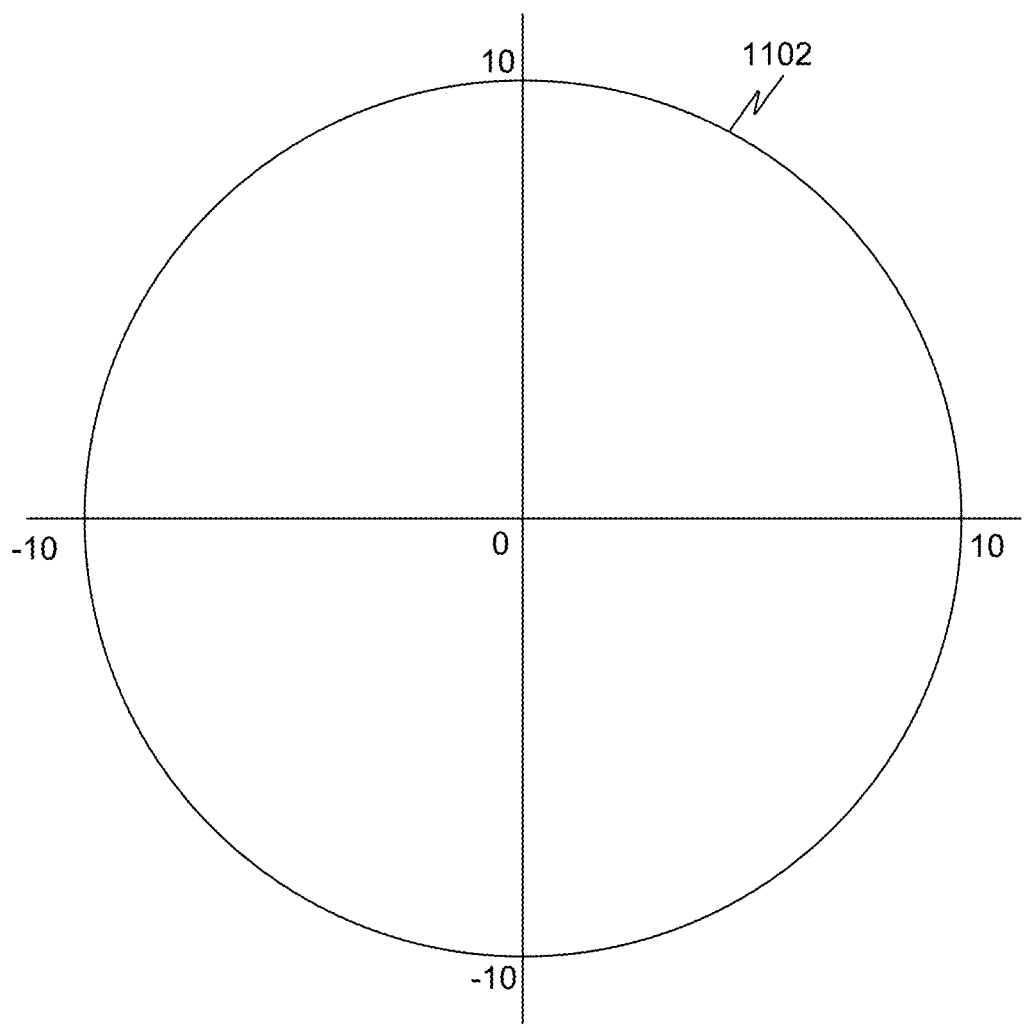
FIG. 11A illustrates a circular navigation pattern 1102 followed by autonomous vehicles during the navigation, in accordance with some embodiments.
Figure 11B:
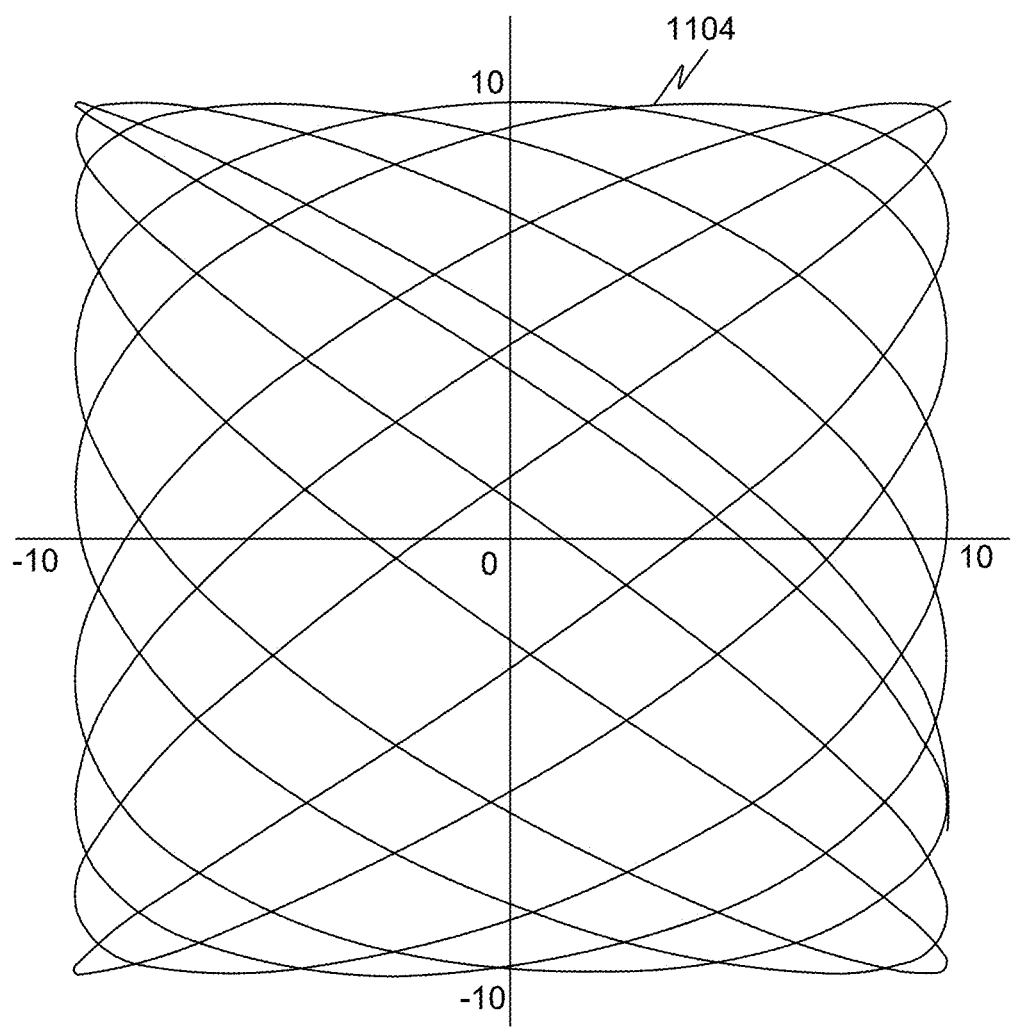
FIG. 11B illustrates a first Lissajous navigation pattern 1104 followed by autonomous vehicles during the navigation, in accordance with some embodiments.
Figure 11C:
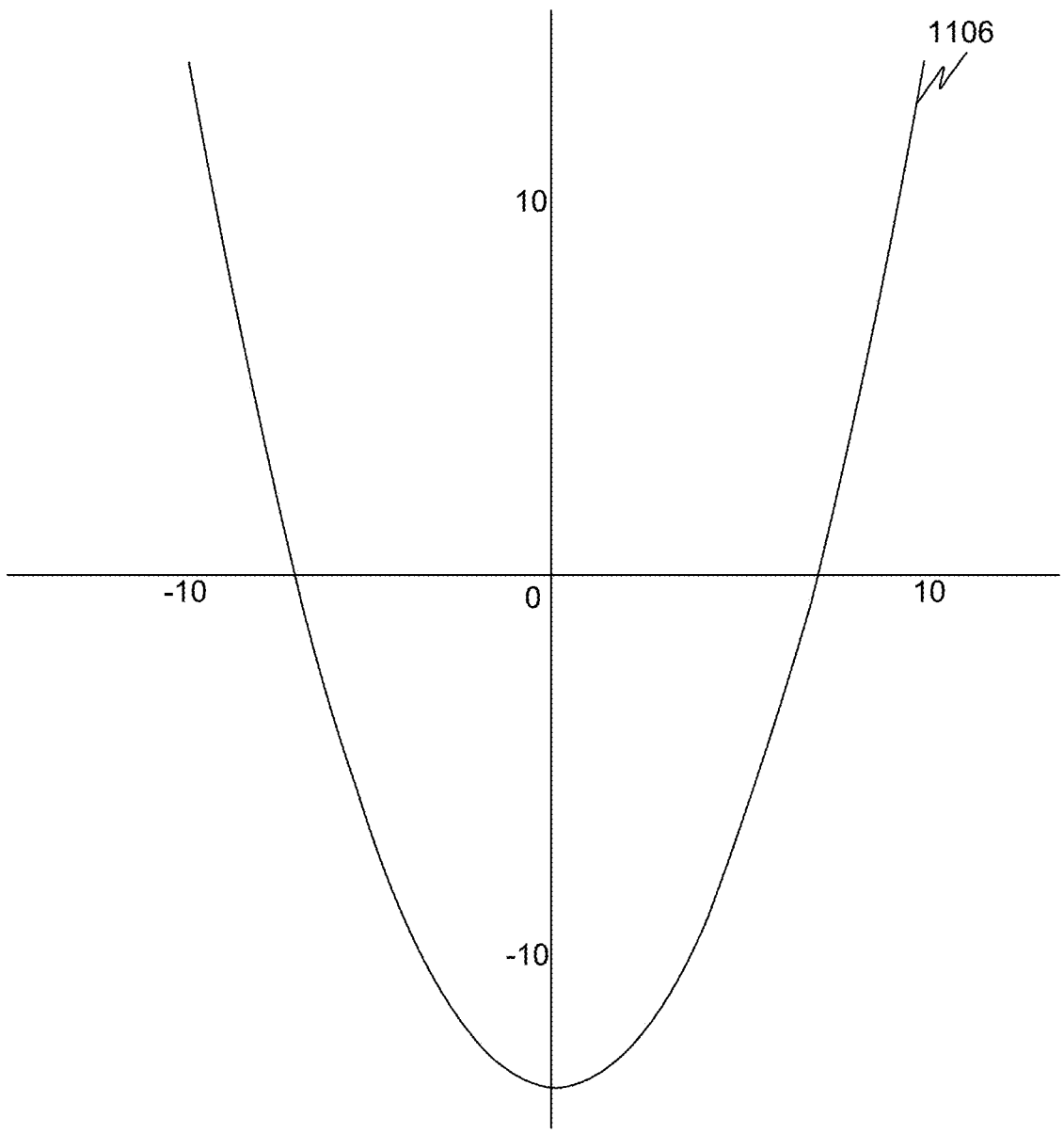
FIG. 11C illustrates a second Lissajous navigation pattern 1106 followed by autonomous vehicles during the navigation, in accordance with some embodiments.
Figure 11D:
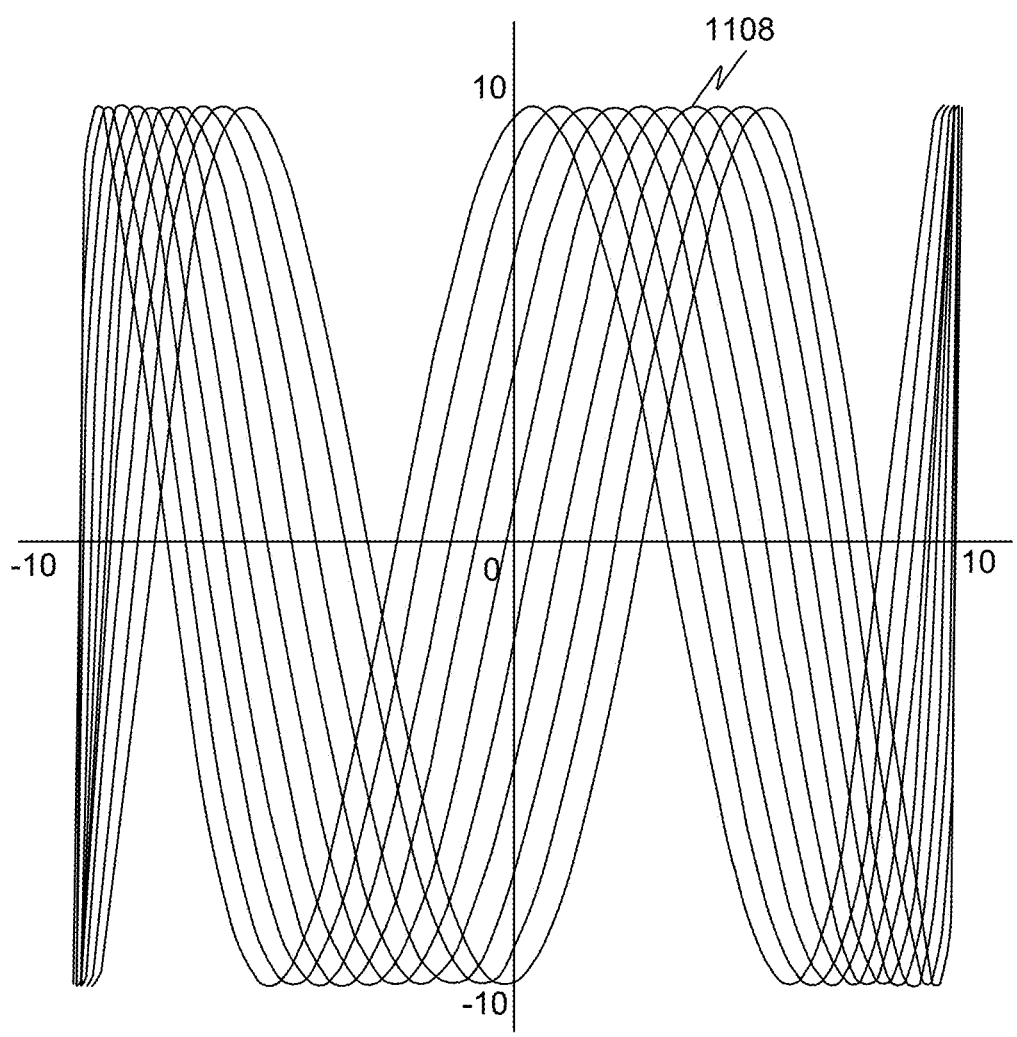
FIG. 11D illustrates a third Lissajous navigation pattern 1108 followed by autonomous vehicles during the navigation, in accordance with some embodiments.
Figure 11E:
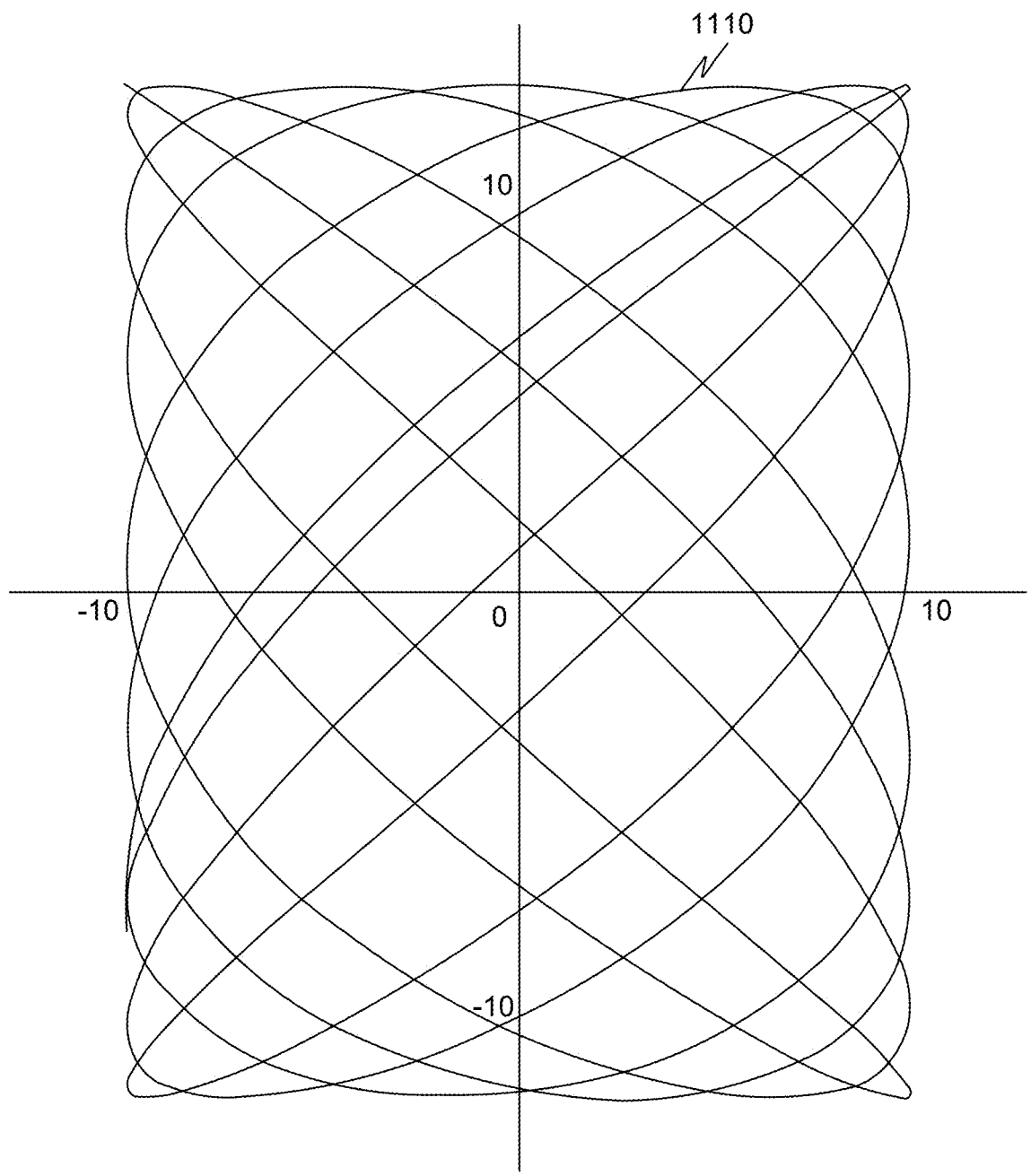
FIG. 11E illustrates a fourth Lissajous navigation pattern 1110 followed by autonomous vehicles during the navigation, in accordance with some embodiments.

FIG. 10 illustrates a flowchart of a method 1000 of facilitating navigation of autonomous vehicles including generating, using the processing device 804, a visualization data, in accordance with some embodiments.

Further, in some embodiments, the method 1000 further may include a step 1002 of generating, using the processing device 804, a visualization data based on the generating of the navigation data. Further, the visualization data corresponds to a visual representation of the two or more geospatial coordinates in a map. Further, in some embodiments, the method 1000 further may include a step 1204 of transmitting, using the communication device 802, the visualization data to the user device 902. Further, the user device 902 may be configured to present the visual representation on a user presentation device. Further, the user presentation device may be comprised in the user device 902.

In some embodiments, the generating of the navigation data includes generating of the navigation data may be in a specific format. Further, the specific format may be compatible with an autopilot system associated with the one or more autonomous vehicles 904. Further, the transmitting of the navigation data includes transmitting the navigation data characterized by the specific format.

In some embodiments, the determining of the one or more bounded areas may be further based on the analyzing of the one or more parameters. Further, the one or more parameters correspond to a shape of the one or more bounded areas. Further, the one or more bounded areas may be characterized by the shape.

In some embodiments, the shape includes one or more of a square, a rectangle, and a polygon.

FIG. 11A-11E illustrates two or more predefined navigation patterns followed by autonomous vehicle during the navigation, in accordance with some embodiments.

In some embodiments, the two or more predefined navigation patterns include a simple pattern, a complex pattern, a finite pattern, an infinite pattern, and a sensitive pattern.

In some embodiments, the two or more predefined navigation patterns include a circular navigation pattern 1102, a first Lissajous navigation pattern 1104, a second Lissajous navigation pattern 1106, a third Lissajous navigation pattern 1108, and a fourth Lissajous navigation pattern 1110.

In some embodiments, the simple pattern includes a left to right row.

In some embodiments, the complex pattern includes one or more of a logarithmic spiral, a zig-zag coverage, and a parametric curve.

In some embodiments, the one or more parameter data may be received during the performing of the one or more missions.

In some embodiments, the environment includes one or more of a land, an air, and a sea.

In some embodiments, the navigation path may be dynamically updatable during the performing of the one or more missions.

In some embodiments, the one or more missions may be performed by two or more autonomous vehicles. Further, the two or more autonomous vehicles may be communicatively coupled with each other. Further, the two or more autonomous vehicles may be configured to transmit one or more mission data between the two or more autonomous vehicles.

In some embodiments, the one or more mission data indicate one or more of a status update, a target detection, and a navigation adjustment.

In some embodiments, the one or more mission factors correspond to one or more of a battery level of the one or more autonomous vehicles 904, a terrain elevation data, an environmental condition of the environment, and an obstacle in the navigation path.

In some embodiments, the method 300 may further include storing, using a storage device, the two or more geospatial coordinates with corresponding Cartesian coordinates in a database for one or more purposes.

In some embodiments, the one or more purposes include at least one includes one or more of simulation purpose, reusing purpose, and a mission replay purpose.

In some embodiments, one or more of the two or more Cartesian coordinates are associated with a high latitude.

In some embodiments, the characteristic of the two or more geospatial coordinates correspond to a distance between the two or more geospatial coordinates In some embodiments, the one or more sequencing parameters include one or more of a directionality of the navigation, a priority of the one or more missions, and an operational constraint associated with the one or more autonomous vehicles 904.

In some embodiments, the navigation data includes two or more waypoints comprising one or more of the two or more geospatial coordinates. Further, the navigation path defines two or more visits of the one or more autonomous vehicles 904 to one or more of the two or more waypoints during the performing of the one or more missions.

In some embodiments, the navigation data includes two or more waypoints comprising one or more of the two or more geospatial coordinates. Further, the navigation path defines a single visit of the one or more autonomous vehicles 904 to one or more of the two or more waypoints during the performing of the one or more missions.

In some embodiments, the navigation data includes two or more waypoints comprising one or more of the two or more geospatial coordinates. Further, the navigation path defines a single visit of the one or more autonomous vehicles 904 to each of the two or more waypoints during the performing of the one or more missions.

In some embodiments, the one or more modifications correspond to change in order of the two or more waypoints of the navigation path.

In some embodiments, the method 300 may further include storing, using the storage device, one or more of the one or more two-dimensional grids and the one or more mathematical transformation formulas in the database.

In some embodiments, the one or more mission factors include a wind speed.

Although the invention has been explained in relation to its preferred embodiment, it is to be understood that many other possible modifications and variations can be made without departing from the spirit and scope of the invention as hereinafter claimed.

What is claimed is:

1. A method of facilitating navigation of autonomous vehicles, the method comprising:
receiving, using a communication device, a reference data from a user device, wherein the reference data comprises a reference geospatial coordinate defining a reference location;
analyzing, using a processing device, the reference data;
determining, using the processing device, at least one bounded area around the reference location based on the analyzing of the reference data;
generating, using the processing device, at least one two-dimensional grid based on the determining, wherein the at least one two-dimensional grid comprises a plurality of Cartesian coordinates for the at least one bounded area;
transforming, using the processing device, the plurality of Cartesian coordinates using at least one mathematical transformation formula;
generating, using the processing device, a plurality of geospatial coordinates based on the transforming, wherein the plurality of geospatial coordinates indicates a plurality of geospatial locations of the at least one bounded area;
analyzing, using the processing device, the plurality of geospatial coordinates;
determining, using the processing device, a navigation path based on the analyzing of the plurality of geospatial coordinates;
generating, using the processing device, a navigation data based on the determining of the navigation path, wherein the navigation data represents the navigation path; and
transmitting, using the communication device, the navigation data to at least one autonomous vehicle associated with at least one mission, wherein the at least one autonomous vehicle is configured for performing the at least one mission by navigating between the plurality of geospatial coordinates based on the navigation path.

2. The method of claim 1 further comprising:
receiving, using the communication device, at least one indication from the user device, wherein the at least one indication indicates the at least one mission associated with the at least one autonomous vehicle;
analyzing, using the processing device, the at least one indication; and
identifying, using the processing device, a mission-specific navigation pattern from a plurality of predefined navigation patterns based on the analyzing of the at least one indication, wherein the analyzing of the plurality of geospatial coordinates is further based on the identifying of the mission-specific navigation pattern, wherein the analyzing of the plurality of geospatial coordinates comprises analyzing the plurality of geospatial coordinates based on the mission-specific navigation pattern, wherein the navigation path comprises the mission-specific navigation pattern.

3. The method of claim 1, wherein the transforming of the plurality of Cartesian coordinates comprises transforming the plurality of Cartesian coordinates using a coordinate transformation module, wherein the coordinate transformation module is configured for:
applying the at least one mathematical transformation formula to each of the plurality of Cartesian coordinates; and
performing at least one of a projection approximation and an affine transformation of each of the plurality of Cartesian coordinates based on the applying of the at least one mathematical transformation formula, wherein the generating of the plurality of geospatial coordinates is further based on the performing of at least one of the projection approximation and the affine transformation.

4. The method of claim 1 further comprising:
receiving, using the communication device, at least one parameter from the user device, wherein the at least one parameter is associated with the at least one two-dimensional grid; and
analyzing, using the processing device, the at least one parameter, wherein the generating of the at least one two-dimensional grid is further based on the analyzing of the at least one parameter, wherein the at least one two-dimensional grid is characterized by the at least one parameter.

5. The method of claim 1 further comprising:
receiving, using the communication device, at least one factor data from the at least one autonomous vehicle, wherein the at least one factor data indicates at least one mission factor associated with at least one of the at least one autonomous vehicle and an environment during the performing of the at least one mission, wherein the at least one autonomous vehicle is present in the environment to perform the at least one mission;
analyzing, using the processing device, the at least one factor data; and
determining, using the processing device, at least one modification of the navigation path and a characteristic of the plurality of the geospatial coordinates based on the analyzing of the at least one factor data, wherein the generating of the at least one two-dimensional grid is further based on the at least one modification, wherein the determining of the navigation path is further based on the at least one modification, wherein the characteristic of the plurality of the geospatial coordinates is based on a characteristic of the at least one two-dimensional grid.

6. The method of claim 1, wherein the generating of the at least one two-dimensional grid comprises generating the at least one two-dimensional grid using a grid generation module based on the determining of the at least one bounded area, wherein the grid generation module is configured for determining a spacing between a plurality of grid lines associated with a plurality of axes of a Cartesian coordinate system, wherein the plurality of axes are mutually perpendicular, wherein the spacing comprises an even spacing between the plurality of grid lines, wherein the generating of the at least one two-dimensional grid is further based on the determining of the spacing.

7. The method of claim 1 further comprising:
receiving, using the communication device, a constraint data from the user device, wherein the constraint data indicates at least one mission-specific constraint associated with the at least one mission; and
analyzing, using the processing device, the constraint data, wherein the determining of the navigation path is further based on the analyzing of the constraint data.

8. The method of claim 3, wherein the coordinate transformation module is further configured for performing an equirectangular approximation based on the applying of the at least one mathematical transformation formulas, wherein the generating of the plurality of geospatial coordinates is further based on the performing of the equirectangular approximation.

9. The method of claim 3, wherein the transforming of the plurality of Cartesian coordinates comprises:
applying at least one geographical correction factor to at least one of the plurality of Cartesian coordinates; and
correcting at least one curvature distortion associated with at least one of the plurality of Cartesian coordinates based on the applying of the at least one geographical correction factor, wherein the generating of the plurality of geospatial coordinates is further based on the correcting of the at least one curvature distortion.

10. The method of claim 1, wherein the analyzing of the plurality of geospatial coordinates comprises applying at least one waypoint sequencing function to the plurality of geospatial coordinates, wherein the at least one waypoint sequencing function considers at least one sequencing parameter associated with at least one of the at least one mission and the at least one autonomous vehicle, wherein the determining of the navigation path is based on the applying of the at least one waypoint sequencing function.

11. A system of facilitating navigation of autonomous vehicles, the system comprising:
a communication device is configured for:
receiving a reference data from a user device, wherein the reference data comprises a reference geospatial coordinate defining a reference location;
transmitting a navigation data to at least one autonomous vehicle associated with at least one mission, wherein the at least one autonomous vehicle is configured for performing the at least one mission by navigating between a plurality of geospatial coordinates based on a navigation path;
a processing device communicatively coupled with the communication device, wherein the processing device is configured for:
analyzing the reference data;
determining at least one bounded area around the reference location based on the analyzing of the reference data;
generating at least one two-dimensional grid based on the determining,
wherein the at least one two-dimensional grid comprises a plurality of Cartesian coordinates for the at least one bounded area;
transforming the plurality of Cartesian coordinates using at least one mathematical transformation formula;
generating the plurality of geospatial coordinates based on the transforming, wherein the plurality of geospatial coordinates indicates a plurality of geospatial locations of the at least one bounded area;
analyzing the plurality of geospatial coordinates;
determining the navigation path based on the analyzing of the plurality of geospatial coordinates; and
generating the navigation data based on the determining of the navigation path, wherein the navigation data represents the navigation path.

12. The system of claim 11, wherein the communication device is further configured for receiving at least one indication from the user device, wherein the at least one indication indicates the at least one mission associated with the at least one autonomous vehicle, wherein the processing device is further configured for:
analyzing the at least one indication; and
identifying a mission-specific navigation pattern from a plurality of predefined navigation patterns based on the analyzing of the at least one indication, wherein the analyzing of the plurality of geospatial coordinates is further based on the identifying of the mission-specific navigation pattern, wherein the analyzing of the plurality of geospatial coordinates comprises analyzing the plurality of geospatial coordinates based on the mission-specific navigation pattern, wherein the navigation path comprises the mission-specific navigation pattern.

13. The system of claim 11, wherein the transforming of the plurality of Cartesian coordinates comprises transforming the plurality of Cartesian coordinates using a coordinate transformation module, wherein the coordinate transformation module is configured for:
applying the at least one mathematical transformation formula to each of the plurality of Cartesian coordinates; and performing at least one of a projection approximation and an affine transformation of each of the plurality of Cartesian coordinates based on the applying of the at least one mathematical transformation formula, wherein the generating of the plurality of geospatial coordinates is further based on the performing of at least one of the projection approximation and the affine transformation.

14. The system of claim 11, wherein the communication device is further configured for receiving at least one parameter from the user device, wherein the at least one parameter is associated with the at least one two-dimensional grid, wherein the processing device is further configured for analyzing the at least one parameter, wherein the generating of the at least one two-dimensional grid is further based on the analyzing of the at least one parameter, wherein the at least one two-dimensional grid is characterized by the at least one parameter.

15. The system of claim 11, wherein the communication device is further configured for receiving at least one factor data from the at least one autonomous vehicle, wherein the at least one factor data indicates at least one mission factor associated with at least one of the at least one autonomous vehicle and an environment during the performing of the at least one mission, wherein the at least one autonomous vehicle is present in the environment to perform the at least one mission, wherein the processing device is further configured for:
analyzing the at least one factor data; and
determining at least one modification of at least one of the navigation path and a characteristic of the plurality of the geospatial coordinates based on the analyzing of the at least one factor data, wherein the generating of the at least one two-dimensional grid is further based on the at least one modification, wherein the determining of the navigation path is further based on the at least one modification, wherein the characteristic of the plurality of the geospatial coordinates is based on a characteristic of the at least one two-dimensional grid.

16. The system of claim 11, wherein the generating of the at least one two-dimensional grid comprises generating the at least one two-dimensional grid using a grid generation module based on the determining of the at least one bounded area, wherein the grid generation module is configured for determining a spacing between a plurality of grid lines associated with a plurality of axes of a Cartesian coordinate system, wherein the plurality of axes are mutually perpendicular, wherein the spacing comprises an even spacing between the plurality of grid lines, wherein the generating of the at least one two-dimensional grid is further based on the determining of the spacing.

17. The system of claim 11, wherein the communication device is further configured for receiving a constraint data from the user device, wherein the constraint data indicates at least one mission-specific constraint associated with the at least one mission, wherein the processing device is further configured for analyzing the constraint data, wherein the determining of the navigation path is further based on the analyzing of the constraint data.

18. The system of claim 13, wherein the coordinate transformation module is further configured for performing an equirectangular approximation based on the applying of the at least one mathematical transformation formulas, wherein the generating of the plurality of geospatial coordinates is further based on the performing of the equirectangular approximation.

19. The system of claim 13, wherein the transforming of the plurality of Cartesian coordinates comprises:
applying at least one geographical correction factor to at least one of the plurality of Cartesian coordinates; and
correcting at least one curvature distortion associated with at least one of the plurality of Cartesian coordinates based on the applying of the at least one geographical correction factor, wherein the generating of the plurality of geospatial coordinates is further based on the correcting of the at least one curvature distortion.

20. The system of claim 11, wherein the analyzing of the plurality of geospatial coordinates comprises applying at least one waypoint sequencing function to the plurality of geospatial coordinates, wherein the at least one waypoint sequencing function considers at least one sequencing parameter associated with at least one of the at least one mission and the at least one autonomous vehicle, wherein the determining of the navigation path is based on the applying of the at least one waypoint sequencing function.

* * * * *